US011131747B2

(12) United States Patent
Jennings et al.

(10) Patent No.: US 11,131,747 B2
(45) Date of Patent: Sep. 28, 2021

(54) SYSTEMS AND METHODS FOR REMOTELY CONTROLLED DEVICE POSITION AND ORIENTATION DETERMINATION

(75) Inventors: Chris P. Jennings, Merrimack, NH (US); James R. Rahaim, Amherst, NH (US)

(73) Assignee: UNITED STATES FOUNDATION FOR INSPIRATION AND RECOG, Manchester, NH (US)

( * ) Notice: Subject to any disclaimer, the term of this patent is extended or adjusted under 35 U.S.C. 154(b) by 0 days.

(21) Appl. No.: 13/077,239

(22) Filed: Mar. 31, 2011

(65) Prior Publication Data

US 2011/0256800 A1     Oct. 20, 2011

Related U.S. Application Data

(60) Provisional application No. 61/319,647, filed on Mar. 31, 2010.

(51) Int. Cl.
| | |
|---|---|
| *G01S 5/16* | (2006.01) |
| *G05D 1/02* | (2020.01) |
| *G05D 1/00* | (2006.01) |
| *G01S 1/70* | (2006.01) |

(52) U.S. Cl.
CPC .............. *G01S 5/16* (2013.01); *G01S 1/7034* (2019.08); *G01S 1/7038* (2019.08); *G05D 1/0027* (2013.01); *G05D 1/0234* (2013.01); *G05D 1/0287* (2013.01); *G05D 1/027* (2013.01); *G05D 1/0246* (2013.01); *G05D 2201/0214* (2013.01)

(58) Field of Classification Search
CPC .. G05D 1/0287; G05D 1/0234; G05D 1/0027; G05D 2201/0214; G05D 1/027; G05D 1/0246

USPC ............................................................. 701/2
See application file for complete search history.

(56) References Cited

U.S. PATENT DOCUMENTS

| | | | | |
|---|---|---|---|---|
| 4,622,644 | A | * | 11/1986 | Hansen ......................... 702/153 |
| 4,945,305 | A | * | 7/1990 | Blood ....................... 324/207.17 |
| 5,416,711 | A | | 5/1995 | Gran et al. |
| 5,558,091 | A | * | 9/1996 | Acker et al. ................... 600/424 |
| 5,706,195 | A | * | 1/1998 | Corby et al. ....................... 701/2 |
| 6,266,142 | B1 | * | 7/2001 | Junkins et al. ................ 356/623 |
| 6,408,226 | B1 | | 6/2002 | Byrne et al. |
| 6,467,911 | B1 | * | 10/2002 | Ueyama ................... F21V 17/00 348/E5.137 |
| 6,484,083 | B1 | | 11/2002 | Hayward et al. |
| 6,496,860 | B2 | | 12/2002 | Ludtke et al. |

(Continued)

OTHER PUBLICATIONS

International Search Report and Written Opinion dated Aug. 8, 2011, received in international patent application No. PCT/US2011/030743, 10 pgs.

(Continued)

*Primary Examiner* — Genna M Mott
(74) *Attorney, Agent, or Firm* — Kathleen Chapman

(57) ABSTRACT

A system for a remotely controlled device to determine its location and orientation is disclosed. The system includes a remotely controlled device, at least one sensor connected to the remotely controlled device, the at least one sensor comprising a processor, and at least one emitter, wherein the at least one sensor is configured to receive the signal from the at least one emitter and the processor is configured to determine the location and orientation of the remotely controlled device.

13 Claims, 21 Drawing Sheets

(56) References Cited

U.S. PATENT DOCUMENTS

| | | | |
|---|---|---|---|
| 6,674,259 B1 | 1/2004 | Norman et al. | |
| 7,193,384 B1 | 3/2007 | Norman et al. | |
| 7,225,244 B2 | 5/2007 | Reynolds et al. | |
| 7,263,597 B2 | 8/2007 | Everdell et al. | |
| 7,330,776 B1 | 2/2008 | Norman et al. | |
| 7,586,950 B1 | 9/2009 | Damle et al. | |
| 7,823,210 B2 | 10/2010 | Bessonov et al. | |
| 2001/0037163 A1* | 11/2001 | Allard | B25J 9/1689 700/245 |
| 2003/0004611 A1 | 1/2003 | McKinney, Jr. et al. | |
| 2003/0023987 A1 | 1/2003 | Hiramoto et al. | |
| 2004/0113044 A1* | 6/2004 | Ishiguchi | H05B 33/0869 250/205 |
| 2004/0263797 A1* | 12/2004 | Russell | G03B 21/16 353/57 |
| 2005/0159832 A1 | 7/2005 | Umeo et al. | |
| 2005/0213109 A1* | 9/2005 | Schell et al. | 356/614 |
| 2006/0026017 A1 | 2/2006 | Walker | |
| 2006/0206246 A1 | 9/2006 | Walker | |
| 2006/0259266 A1 | 11/2006 | Bizet et al. | |
| 2007/0005304 A1 | 1/2007 | Celestini | |
| 2007/0261125 A1 | 11/2007 | Ginter et al. | |
| 2008/0100250 A1 | 5/2008 | Norman et al. | |
| 2008/0263628 A1 | 10/2008 | Norman et al. | |
| 2008/0269949 A1 | 10/2008 | Norman et al. | |
| 2009/0033879 A1* | 2/2009 | Saito | 353/52 |
| 2009/0081923 A1* | 3/2009 | Dooley | A63F 9/143 446/456 |
| 2009/0109082 A1 | 4/2009 | Rose | |
| 2009/0254671 A1 | 10/2009 | Richard et al. | |
| 2009/0307395 A1 | 12/2009 | Umeo et al. | |
| 2009/0323121 A1* | 12/2009 | Valkenburg et al. | 358/1.18 |
| 2010/0286839 A1 | 11/2010 | Iaquinangelo et al. | |
| 2010/0306667 A1 | 12/2010 | Umeo et al. | |
| 2011/0029244 A1 | 2/2011 | Lagmanson et al. | |

OTHER PUBLICATIONS

International Search Report with Written Opinion, dated Jul. 21, 2011, received in international patent application No. PCT/US09/040830, 7 pgs.

International Preliminary Report on Patentability and Written Opinion, dated Sep. 1, 2011, received in international patent application No. PCT/US2009/040830, 5 pgs.

U.S. Appl. No. 12/425,149, filed Apr. 16, 2009.

* cited by examiner

SYSTEMS AND METHODS FOR REMOTELY CONTROLLED DEVICE POSITION AND ORIENTATION DETERMINATION

CROSS REFERENCE TO RELATED APPLICATIONS

This application claims the benefit of U.S. Provisional Application No. 61/319,647 filed Mar. 31, 2010 and entitled System and Method for Tracking the Position and Orientation of Remotely Controlled Devices, which is hereby incorporated herein by reference in its entirety.

TECHNICAL FIELD

The present invention relates to remotely controlled devices and, more particularly, systems and methods for dynamically tracking the position and orientation of remotely controlled devices and for remotely controlled device position and orientation determination.

BACKGROUND INFORMATION

Position tracking systems such as field level systems may be used to track the position of a remotely controlled device. These systems may employ field level sensing devices such as overhead cameras. The overhead camera may be positioned over a field on which the remotely controlled device may move. As the camera records the remotely controlled device, a processor may use algorithms to analyze the input from the overhead camera and transmit to each "tracked" remotely controlled device, the position of the device on the field.

These systems typically require precise ambient lighting conditions in order to track the position of a remotely controlled device. Moreover, the field level approach requires significant expense in terms of equipment and extensive processing capacity in order to the track position of each remotely controlled device and then relay this data back to each remotely controlled device. The computational demands needed to track each device may result in less than real time dynamic navigational information to the remotely controlled devices. As such, the resolution and speed of determining location coupled with latency in delivering this information may be limiting. Other position tracking systems such as laser range finders and ultrasound systems are also costly and require extensive processing power.

Accordingly, there is a need for improved methods, systems and devices for tracking the position and orientation of remotely controlled devices

SUMMARY

In accordance with one aspect of the present invention, a system for determining the specific location of a remotely controlled device is disclosed. The system includes at least one sensor, at least one transmitter, and at least one emitter.

In accordance with one aspect of the present invention, a system for a remotely controlled device to determine its location and orientation is disclosed. The system includes a remotely controlled device, at least one sensor connected to the remotely controlled device, the at least one sensor comprising a processor, and at least one emitter, wherein the at least one sensor is configured to receive the signal from the at least one emitter and the processor is configured to determine the location and orientation of the remotely controlled device.

Some embodiments of this aspect of the invention may include one or more of the following. Wherein the at least one emitter is a passive emitter. Wherein the at least one emitter is an active emitter.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF EXEMPLARY EMBODIMENTS

Figure 1:
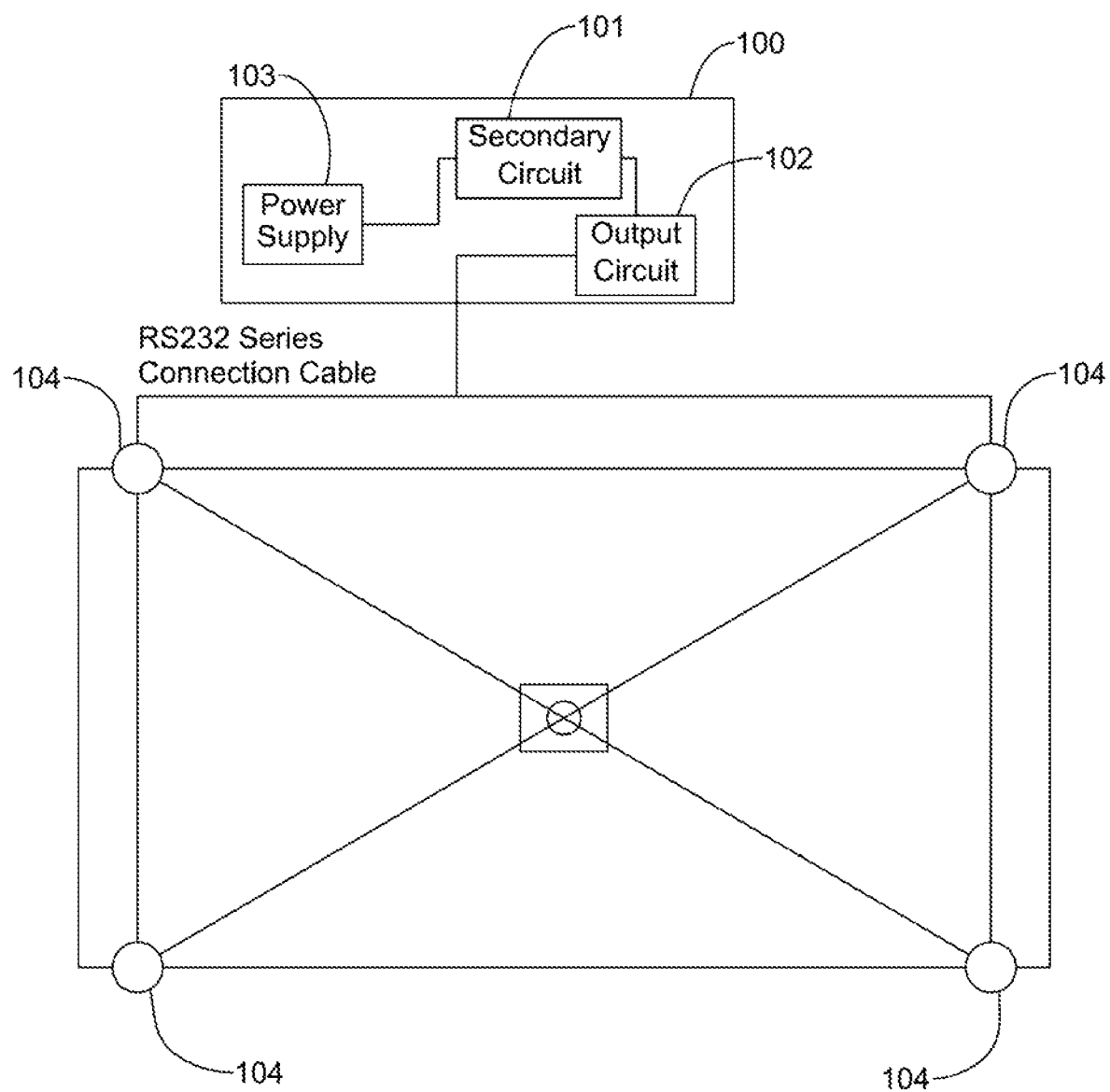
FIG. 1 is a diagram of a field with a control module, emitter units, and a sensor module on a remotely controlled device according to one embodiment.

Disclosed herein are various embodiments of a system, method and devices for a mobile device, for example, a robot, to determine its position using a sensor or detector, which may be, in some embodiments, located on or in the mobile device. In various embodiments, the mobile device detects emitted signals; either passively emitted or actively emitted, and processes the signals to determine its own location. Thus, in various embodiments, the mobile device determines its own position. In various embodiments, the determination of the position may be completed in real time, i.e., no lead time is required. In various embodiments, the mobile device self-positions using the sensor/detector.

In some embodiments, the sensor/detector may sense and/or detect electric and/or radio frequency signals and/or other signals produced by one or more emitters. In various embodiments, the sensor/detector may be a camera or other devices that recognize, using pictures/text, "pictorial signals", for example, pictures and/or numbers and/or symbols that are "emitted"/located/positioned in a position/location and "read" or sensed by the camera. These forms of emitters may be termed "passive emitters". In some embodiments, the camera may read the signal and determines both the distance between the mobile device and the symbol together with the angular location ("target angle") with respect to the camera and the symbol. In some embodiments, the camera may, using more than one symbol, may determine the mobile device location using triangulation methods. In some embodiments, the signal itself may be indicative of a particular "location", for example, may include, but not limited to, "north most wall", "south", "exit", "door", or "stairway". In some embodiments, the sensor/camera may determine the location of the mobile device using one symbol. Thus, the sensor/detector in various embodiments may sense and/or detect various emitted and/or located signals.

In some embodiments, the system includes components to facilitate mobile devices with the ability to determine their specific location within the perimeter of placement of those components. Thus, in some embodiments, disclosed herein is a reliable automated and dynamic method for a mobile device to determine the position and orientation of the mobile device within an area. The system components may include, but are not limited to, a central synchronizing element, which, in some embodiments, is a transmitter; emitter elements; and a detector, which in some embodiments, may be a sensor.

In some embodiments, the transmitter generates a continuous series of signals being conveyed to a number of emitter units positioned in a manner to create a perimeter of an area. Upon receipt of the continuous series of signals, the emitter units may utilize the continuous series of signals, i.e., actively emitted signals, to determine a unique pattern of signals, synchronized to the transmitter signals. These may then be converted to a form of emitted energy detectable by the detector/sensor components (which, herein, may be referred to collectively as a "sensor").

The sensor, in some embodiments, may be mounted on a mobile device. Upon detecting the emitted energy of each or a combination of the transmitters and from a sufficient number of emitter units, the sensor may determine the relative position and emitted energy, as signal strength, of the detected transmitters. The sensor processes this information using programmable electronic logic components contained within the sensor and determines, then conveys to the electronic logic components of the mobile device, using electronic transmission, the position of the sensor, relative to the area defined by the perimeter created by the positioning of the emitter units. The information regarding the position of the sensor includes a meaningful set of numerical coordinates suitable for processing by software operating in the programmable electronic logic components of the mobile device. This information may be used, for example, for navigation of the mobile device within that area.

Some embodiments of the various components, methods and systems are described below. However, these are exemplary embodiments. Other embodiments may be used.

The Control Module

Referring to FIG. 1, an embodiment of a control module is shown. In some embodiments, the control module 100 may include a synchronizing circuit 101 and an output circuit 102 that may be communicatively coupled to an emitter unit 104, discussed in detail below. In some embodiments, the synchronizing circuit 101 may include at least one clock generator, which, in some embodiments, may produce a stable and precise continuous clock signal. In some embodiments, the control module may further include at least one power supply 103. In some embodiments, the components of the control module may be fixed inside the control module. However, in some embodiments, the components of the control module may be modular and may be removable from the control module.

In some embodiments, the clock signal may be electronically transmitted to an emitter unit 104 as a continuous data transmission. In such embodiments, the output circuit 102 of the control module 100 may be wired directly to at least one emitter unit 104. However, in some embodiments, the clock signal from the control module 100 may be conveyed to the emitter units 104 wirelessly, using, in some embodiments, wireless transceivers (not shown). In some embodiments, the wireless transceivers may be communicatively coupled at the output circuit 102 of the control module 100. In some embodiments, the wireless transceivers (not shown) may be communicatively coupled to the input circuits 209 of the emitter units 104.

In some embodiments, the control module 100 may also provide power to the emitter units 104 via a power supply module 103 on the control module 100. In some embodiments, a synchronizing pulse signal may be sent by the control module 100 in between clock signals in order to synchronize multiple emitter units 104. Indicator lights such as, but not limited to, LEDs may be coupled to various circuits and modules in the control module to indicate whether the circuits and modules are functioning correctly and whether the control module has power.

The Emitter

Figure 2:
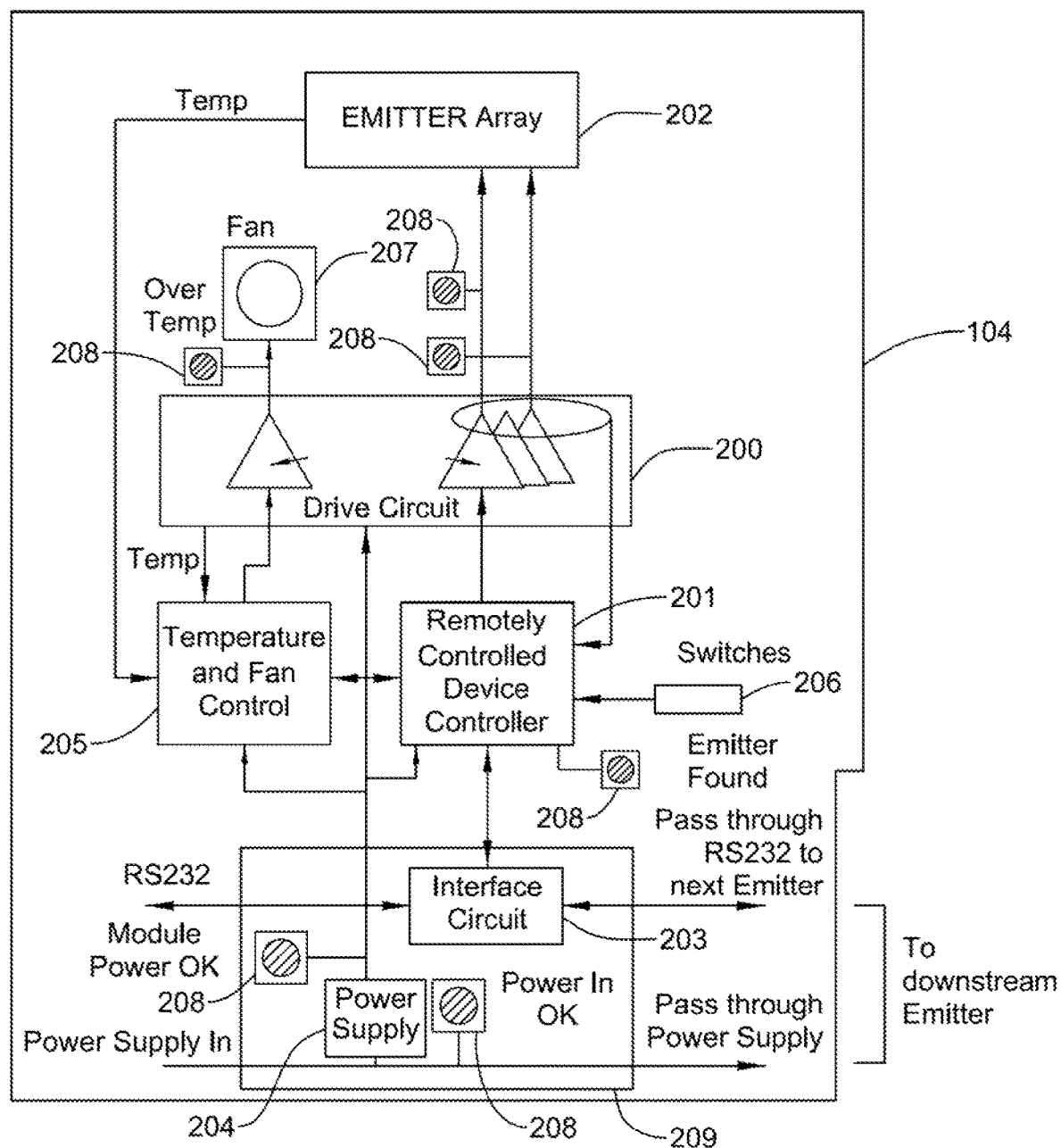
FIG. 2 is a diagram of an emitter unit and related circuitry according to one embodiment.

Referring to FIG. 2, an embodiment of an emitter unit is shown. In some embodiments, the emitter unit 104 may include an input circuit 209 that may be communicatively coupled to the output circuit (not shown, shown as 102 in FIG. 1) of a control module. In some embodiments, the emitter unit 104 may also be communicatively coupled to a driver circuit 200 which, in some embodiments, controls other components in the emitter unit 104. In some embodiments, the emitter unit 104 may be communicatively coupled to an emitter controller 201, and a plurality of emitters 202. In some embodiments, the components of the emitter unit may be fixed inside the emitter unit. Alternatively, in some embodiments, the components of the emitter unit may be modular and may be removable from the emitter unit.

In some embodiments, the input circuit 209 may include an interface circuit 203 configured to receive the clock signal. In some embodiments, the interface circuit 203 of a first emitter unit may be communicatively coupled to the interface circuit of a second emitter (not shown) and relay the clock signal from the control module 100 to the first emitter and then to the second emitter. In some embodiments, the interface circuit 203 may be coupled to the emitter controller 201. In one embodiment, the interface circuit 203 may be an MAX 2327E chipset.

In some embodiments, the input circuit 209 may include at least one power supply module 204. In some embodiments, the power supply module 204 for the emitter unit 104 may power the emitter controller 201, the drive circuit 200, and other additional modules in the emitter unit. In some embodiments, the power supply module 204 may be coupled to an external power supply (not shown). In some embodiments, the external power supply may be the power supply module (not shown, shown as 103 in FIG. 1) of a control module. In some embodiments, the power supply module 204 may be an adjustable power supply module for the purpose of calibrating the emitter unit. In such an embodiment, the adjustable power supply module may be adjustable above the nominal current rating of the emitters.

In some embodiments, it may be desirable to have separate external power supplies for each emitter unit 104 to ensure enough power to each emitter and reduce the line loss that may occur if the emitter units 104 were coupled together. In some embodiments, the power connection between the power supply module 204 and the external power supply may be bundled with the communications cabling or the power connection may be a separate cable.

In some embodiments, the power supply module 204 of the emitter unit may be configured to transmit power to other emitter units (not shown). In some embodiments, the power from the power supply 204 may be adjusted via the emitter controller 201. In such embodiments, the power may be adjusted above the nominal current rating of the plurality of emitters 202. In some embodiments, the emitter controller 201 may be programmed to calibrate the emitter unit 104 by adjusting the power from the power supply 204.

In some embodiments, the clock signal may be sent to the emitter controller 201 from the interface circuit 203. In some embodiments, the clock signal may be sent directly to the emitter controller 201. In some embodiments, the emitter controller 201 may be utilized by the emitter unit 104 to convert the clock signal to a unique emitter signal may be a shift register. In some embodiments, the emitter controller 201 may send control signals to other controllers such as, but not limited to, temperature and fan controller. In some embodiments, the emitter controller 201 may be configured to monitor the drive signal sent by the drive circuit 200 and may adjust the drive signal. In some embodiments, the emitter controller 201 may include a PIC 24 microprocessor produced by Microchip Technology, Inc. of Chandler, Ariz., U.S.A. In some embodiments, the clock signal may be a standard RS232 signal and the interface circuit 203 may convert the RS232 signal to TTL signal levels (voltage) and then may send the signal to the emitter controller 201.

In some embodiments, the clock signal may be a standard RS232 signal and the interface circuit 203 may convert RS232 signal to TTL signal levels (voltage) and then may send the signal directly to driver circuit 200.

In some embodiments, the emitter unit 104 may include at least one emitter 202, and in some embodiments, may include at least two emitters 202 and/or a plurality of emitters 202. In some embodiments, the emitters 202 may include, but not limited to, infrared emitters. In such embodiments, the plurality of infrared emitters may transmit an infrared emitter signal having a wavelength of 940 nm. Furthermore, in such embodiments, TSAL6100 IR LEDs made by Vishay Intertechnology, Inc., of Malvern, Pa., U.S.A., may be used. It may be desirable, in some embodiments, to use a plurality of emitters to generate the optimal signal strength and to provide an even and level signal strength. Note that other emitters that may be used include, but are not limited to, one or more of the following: radio frequency control module, visible light emitters, and/or passive targeting emitters. In some embodiments, passive targeting emitters may be processed by the sensor/detector/camera using vision processing software and/or cameras, for example, NI Vision made by National Instruments Corporation, Austin, Tex., U.S.A. In some embodiments, the unique emitter signal from the emitter controller 201 may be sent to the driver circuit 200 which drives the plurality of emitters 202. In some embodiments, the driver circuit 200 may be a ULN2004A made by Texas Instruments, Inc., Dallas, Tex., U.S.A. or STMicroelectronics, Geneva, Switzerland.

In various embodiments, the plurality of emitters 202 may be driven by a clock signal conveyed by a control module (not shown, shown as 100 in FIG. 1). The emitter unit 104 may use the clock signal to produce a unique emitter signal. The sensor unit 300 (shown in FIG. 3), described in detail below, may identify an emitter unit 104 based on the unique emitter signal. In some embodiments, the emitter unit 104 may further include a selector switch 206 which, in some embodiments, may be adjusted wherein each position on the switch may change the settings of the emitter controller 201 to produce different unique emitter signals depending on, for example, the position of the selector switch 206.

In some embodiments, the emitter unit 104 may be configured to send feedback signals to the emitter controller 201, which may provide verification that the emitter unit is functioning properly. Moreover, the feedback signal may be used for calibration of the emitter unit 104. In order to transmit the feedback signal to the emitter controller 201, the output signal of the driver 200 circuit may be transmitted to the emitter controller 201. The output signal from the driver circuit 200 may then be processed by the emitter controller 201 to verify that the driver circuit 200 is functioning. In some embodiments, the emitter controller 201 monitors the output signal for a proper current and if the output signal is below a user-defined threshold, the channel between the emitter controller 201 and the faulty emitter may be shut down. Alternatively other current monitoring devices, such as resistors or integrated circuits, may be used to detect the output of the driver circuit 200. In addition, in some embodiments, the emitter units 104 may be connected to the control module 100 via an RS232 connection which may provide bidirectional communications between the emitter units 104 and the control module 100. The feedback from the emitter units 104 may be sent to the control module 100 on a periodic basis or continuous basis. This may be desirable, in some embodiments, to prevent the feedback communications from interfering with the control module synchronization signals being sent to the emitter units 104. In some embodiments, the control module 100 may send feedback requests via the RS232 connection to each emitter unit 104 and then the emitter unit 104 may then send feedback back to the control module 100. Alternatively, an Ethernet connection may be used to couple the emitter units 104 to the control module 100.

In some embodiments, one or more detectors (not shown) may be coupled to the emitter controller 204. The sensors may detect the emitter signal from the plurality of emitters 202 and may provide feedback regarding the emitter signal to the emitter controller 201. In such embodiments, the feedback may include, but is not limited to, one or more of the following: the signal strength and whether the signal is producing the desired unique emitter signal. Moreover, in such embodiments, the feedback may be used for other purposes such as, but not limited to, one or more of the following: testing signal output, calibration and monitoring the operation of the plurality of emitters 202. The feedback may be provided to the emitter controller 201 in real-time. In some embodiments, the sensors may be TSL262R sensors, made by Texas Advanced Optoelectronic Solutions (TAOS), Plano, Tex., U.S.A.

In some embodiments, it may be desirable to maintain a constant temperature in the emitter unit to maintain the intensity of the emitter signal constant. As such, in some embodiments, a mechanism of thermal 205 sensing may be communicatively coupled to the emitter controller 201. In some embodiments, the thermal sensing mechanism 205 may receive temperature data from the plurality of emitters 202 and the driver circuit 200 and in some embodiments; the mechanism for thermal sensing 205 may send the temperature data to the emitter controller 201. In some embodiments, a user may program an optimal operating temperature into the emitter controller 201. This optimal operating temperature, in some embodiments, may serve as a threshold and, in some embodiments, when the temperature of the emitter unit 104 exceeds an optimal operating temperature, a signal, such as I2C bus communications, may be sent from the emitter controller 201. The mechanism for sensing temperature 205 may then send a signal to the driver circuit 200 to drive the mechanism for dissipating heat 207. In some embodiments, the mechanism for dissipating heat 207 may decrease the temperature of the emitter unit. An example of the mechanism for thermal sensing 205 includes, but is not limited to, one or more board-level temperature sensors such as an ADT7462 temperature/voltage/fan controller IC made by ON Semiconductors. An example of the mechanism for dissipating excess heat 207 may include, but is not limited to, at least one fan coupled to and in fluid communication with the emitter. However, in other embodiments, other mechanism for dissipating excess heat 207 may be used. In some embodiments, the thermal sensing mechanism 205 and thermal dissipating mechanism 207 may be powered by the power supply 204 in the input circuit of the emitter unit.

In various embodiments, the emitter unit may include one or more visible indicators 208. In some embodiments, these visible indicators 208 may be used to, for example, display one or more, but not limited to, the following: the status of the power provided to the emitter unit, the status of each individual emitter, the status of the clock signal, and the status of the feedback signals. In various embodiments, some examples of visible indicators 208 may include, but are not limited to, LEDs located on the emitter, and/or LCD screens provided to the user. In some embodiments, an LED may be communicatively coupled between the external power supply (not shown) and the power supply module 204. In some embodiments, the LED may be configured to signal that power is being transmitted from the external power supply to the power supply module 204 in the emitter unit 104. In some embodiments, an LED may be communicatively coupled between the power supply module 204 in the input circuit 209 and the emitter controller 201 of the emitter unit 104, the drive circuit 200, and any additional controllers in the emitter unit to signal that power is being transmitted to these various components. In some embodiments, an LED may be communicatively coupled to the emitter controller 201 and configured to signal when a proper clock signal is received by the emitter controller 201. In some embodiments, an LED may be communicatively coupled between the driver circuit 200 and emitters 202 and configured to signal when the driver signal is being transmitted to the emitters 202. In some embodiment, an LED may be communicatively coupled between the driver circuit 200 and mechanism for dissipating heat 207 and may be configured to signal when the mechanism for dissipating heat 207 is activated and/or to signal when the emitter unit overheats.

Figure 15:
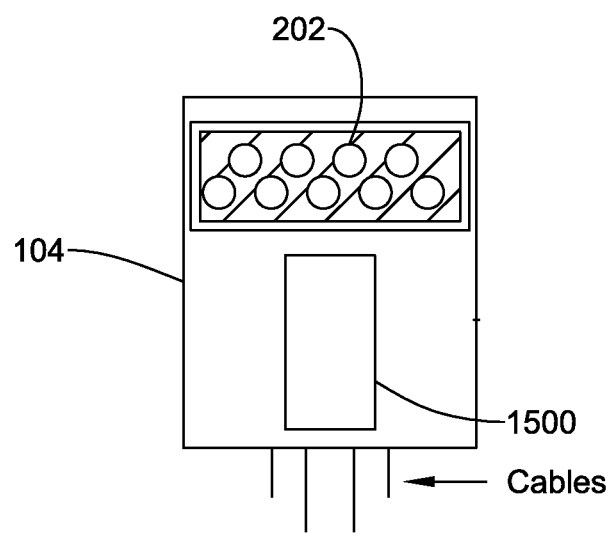
FIG. 15 is a diagram of the front of an emitter unit according to one embodiment.

Referring to FIG. 15, a front view of one embodiment of an emitter is shown. In some embodiments, the communication and power cables may be coupled to the bottom of the emitter unit 104. In some embodiments, the plurality of emitters 202 may be mounted to the front of the emitter unit 104. A mounting bracket 1500 may be used to mount the emitter to a stationary support such as, but not limited to, a pipe.

Figure 16:
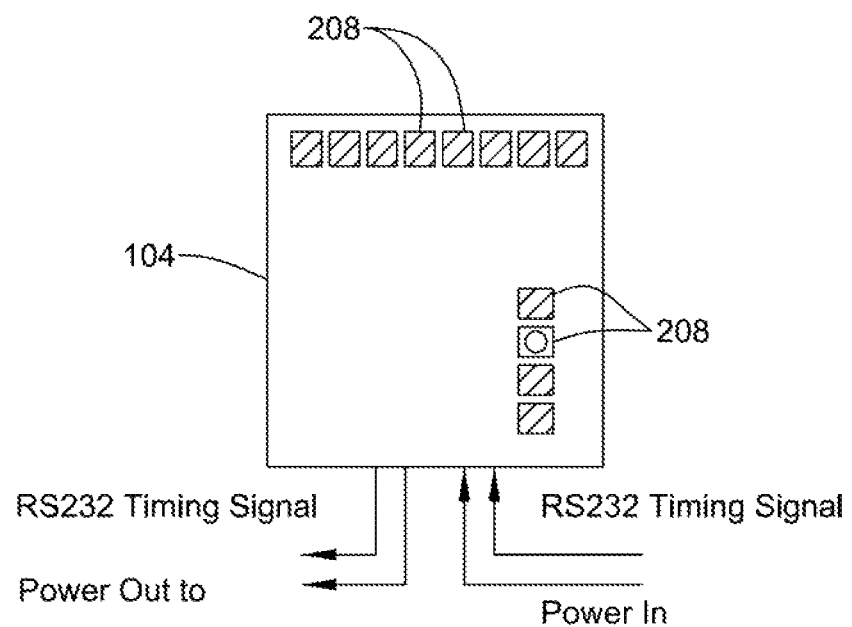
FIG. 16 is a diagram of the back of an emitter unit according to one embodiment.

Referring to FIG. 16, a back view of one embodiment of an emitter is shown. The emitter unit 104 may include at least one visible indicator 208. In some embodiments, the at least one visible indicator 208 may display one or more, but not limited to, the following: the status of the power provided to the emitter unit, the status of each individual emitter, the status of the clock signal, and the status of the feedback signals.

Figure 17:
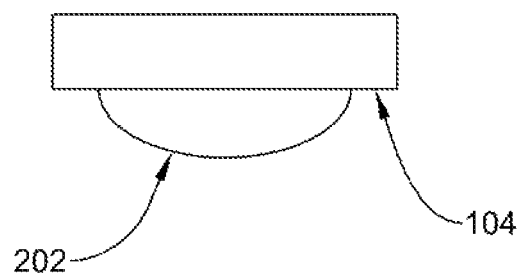
FIG. 17 is a diagram of the top of an emitter unit according to one embodiment.

Referring now to FIG. 17, a top view of an exemplary embodiment of an emitter is shown. In some embodiments, the plurality of emitters 202 on the emitter unit 104 may be mounted on a curved surface.

The Sensor Module and Processor

Figure 3:
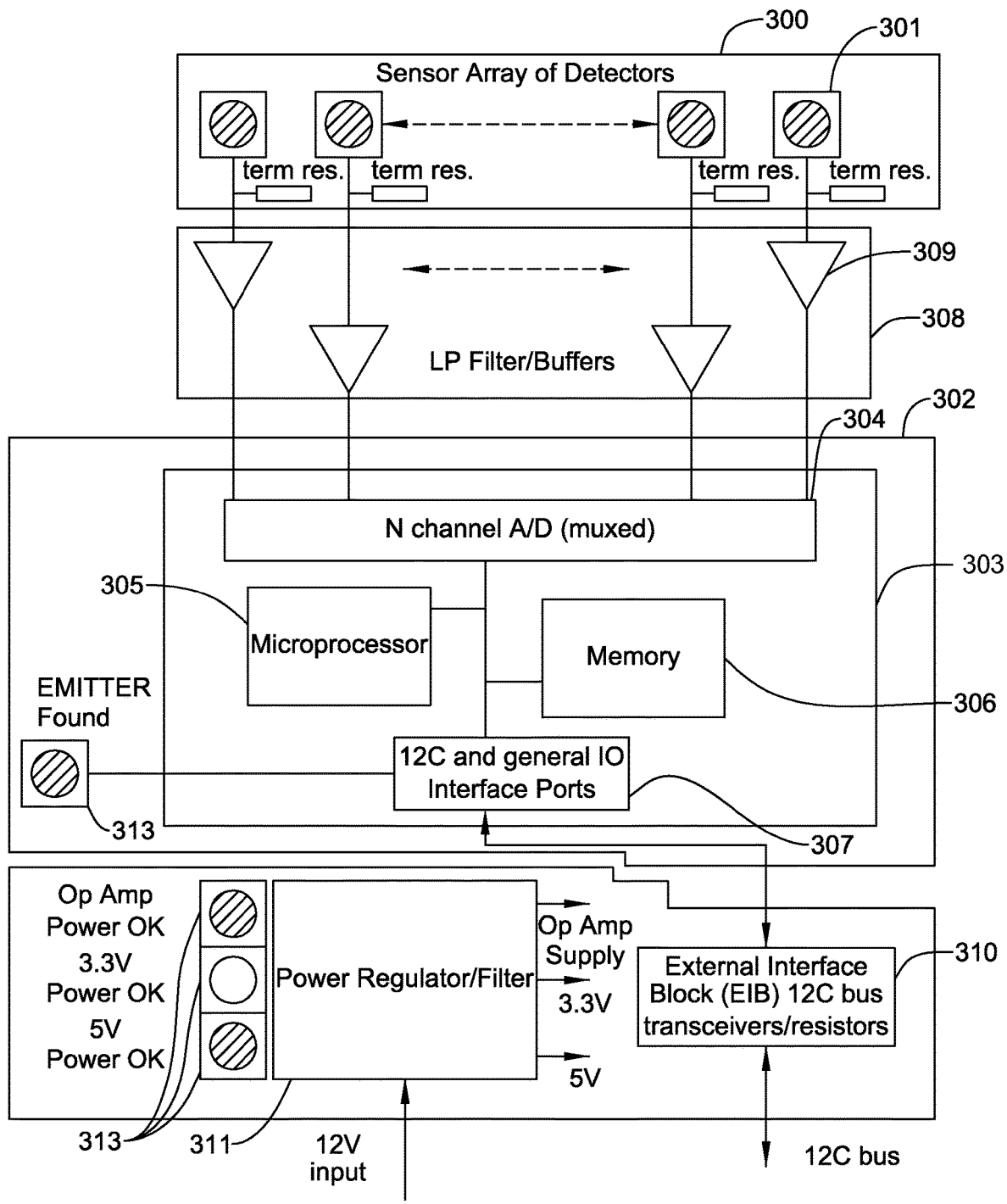
FIG. 3 is a diagram of a sensor module and related circuitry according to one embodiment.

Referring now to FIG. 3, an embodiment of a sensor module is shown. In some embodiments, the sensor module 300 may include at least one, and in some embodiments, a plurality, of detectors 301. The detector 301 may include, but are not limited to, one or more infrared detectors. In such embodiments, the infrared detectors may be BPV22NF sensors made by Vishay Intertechnology, Inc. or TSL262R sensors made by Texas Advanced Optoelectronic Solutions (TAOS). However, in other embodiments, the detectors 301 may be any detector, thus, in various embodiments, other types of detectors, in addition to infrared detectors, may be used. It may be desirable, in some embodiments, for the sensor module to have a full 360 degree field of vision around a remotely controlled device. In some embodiments, the sensor module 300 may be arranged to detect an emitter signal from the horizontal through the vertical sensing field. The number of detectors needed may be determined based on the half angle of the detectors, diameter of the arrangement of the detectors, and amount of overlapping emitter signal detection required to maintain a stable emitter signal throughout the full 360 degree orientation of the sensor module.

In some embodiments, a digital signal processing (DSP) block 302 may be provided to process the emitter signal received by the sensor unit. The DSP block 302 may dynamically update and provide information to the remotely controlled device controller (not shown), referred to in some embodiments as a mobile device controller (MDC), for the remotely controlled device and/or transmit the information on a user interface (not shown). In various embodiments, the DSP block 302 may include at least one microcontroller 303. In some embodiments, the microcontroller 303 may include at least one multiplexed analog-to-digital converter 304 communicatively coupled to the sensor module 300, and a microprocessor 305 communicatively coupled to the multiplexed analog-to-digital converter 304. The microprocessor 305 may also be, in some embodiments, communicatively coupled to at least one memory unit 306, and I2C and I/O interface ports 307. In some embodiments, the multiplexed analog-to-digital converter 304, microprocessor 305, memory unit 306, I2C and I/O interface ports 307 may be contained in a single microcontroller which may include, both is not limited to, an ADI 7026 or ADI 7028 microcontroller made by Analog Devices, Inc. Note that the multiplexed analog-to-digital converter 304 may have a number of input channels equal to the number of detectors. The DSP block 302 may also be coupled to and configured to process data from additional sensors such as, but not limited to, gyros, accelerometers, and rotation sensors. In other embodiments, a signal conditioning block 308 may be included between the sensor module 300 and the DSP block 302. The signal conditioning block 308 may be connected between the sensor module 300 and the multiplexed analog-to-digital converter 304. In some embodiments, the signal conditioning block 308 may be comprised of a plurality of low-pass frequency filters 309. In other embodiments, the number of low-pass frequency filters 309 may be equal to the number of detectors 301 in the sensor module 300. In such embodiments, the low pass filter may be a TLV2772 operational amplifier made by Texas Instruments, Inc.

The DSP block 302 may be coupled to an external interface block (EIB) 310, which may include I2C bus transceivers and resistors. The emitter unit 104 may also include at least one power regulator 311. The EIB 310 may be coupled to the I2C bus of a remotely controlled device controller (not shown), hereafter referred to as the RCDC, for the remotely controlled device. In some embodiments, the power regulator 311 may provide power for the DSP block 302, sensor module 300, and the signal conditioning block 308, and the EIB 310.

In some embodiments, multiple microcontrollers (not shown) may be communicatively coupled together, wherein each microcontroller may be configured to handle different processes including, but not limited to, one or more of the following: frequency filtering, processing the intensity data from the sensor module and additional computational processing such as triangulation of the emitters. In some embodiments, multiple microprocessors (not shown), in a single microcontroller, may be communicatively coupled together, wherein each microprocessor may be configured to handle different processes. In some embodiments, these processes include, but are not limited to, one or more of the following: frequency filtering, processing the intensity data from the sensor module and additional computational processing such as triangulation of the emitters.

In some embodiments, the microcontroller 303 may be programmed to differentiate between the unique emitter signals of emitter units and to determine the orientation of the sensor module and the position of the sensor module relative to the emitter units. In some embodiments, the microcontroller 303 may calculate the orientation and position of the remotely controlled device on the field. In some embodiments, the orientation may be based on the detection of at least two emitter signals being received by the individual detectors or combination of detectors (overlapping emitter signal detection) using known emitter unit positions. Position may be calculated using the relative orientation and distance of the sensor module to the emitter units, based on the relative intensity of the emitter signal being received by the detectors using known emitter unit positions.

In various embodiments, visible indicators 313 which may include, but not limited to, LCD screens and LEDs, may be used to display one or more, but not limited to, the following: the status of the power provided to the sensor unit, the status of each individual sensor, and the status of the feedback signals.

Figure 18:
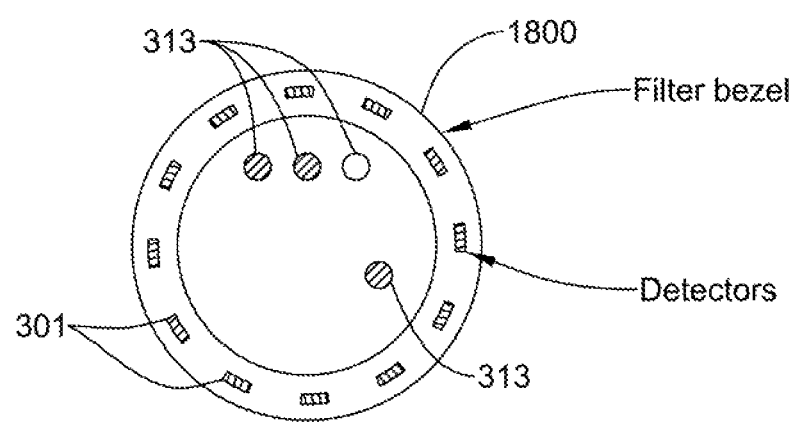
FIG. 18 is a diagram of the top of a sensor module according to one embodiment.

Referring to FIG. 18, a top of one embodiment of a sensor module is shown. In some embodiments, visible indicators 313 may be mounted to the top of the sensor module. In some embodiments, a filter bezel 1800 may be mounted around the sensor module. The filter bezel may cover the plurality of detectors 301 on the sensor module. The filter bezel may be made of materials such as, but not limited to, acrylic glass. It may be desirable, in some embodiments, to have the filter bezel cover the detectors. This may be desired to isolate the detectors from non-incident electromagnetic radiation thereby filtering out electromagnetic radiation that may interfere with the emitter signal.

Figure 19:
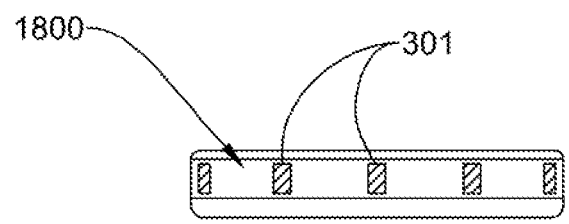
FIG. 19 is a diagram of the side of a sensor module according to one embodiment.

Referring to FIG. 19, a side of one embodiment of a sensor module is shown. In some embodiments, a filter bezel 1800 may be mounted around the sensor module. The filter bezel may cover the plurality of detectors 301 on the sensor module. The filter bezel may be made of materials such as, but not limited to, acrylic glass. It may be desirable, in some embodiments, to have the filter bezel cover the detectors in order to isolate the detectors from non-incident electromagnetic radiation, thereby filtering out electromagnetic radiation that may interfere with the emitter signal.

Figure 20:
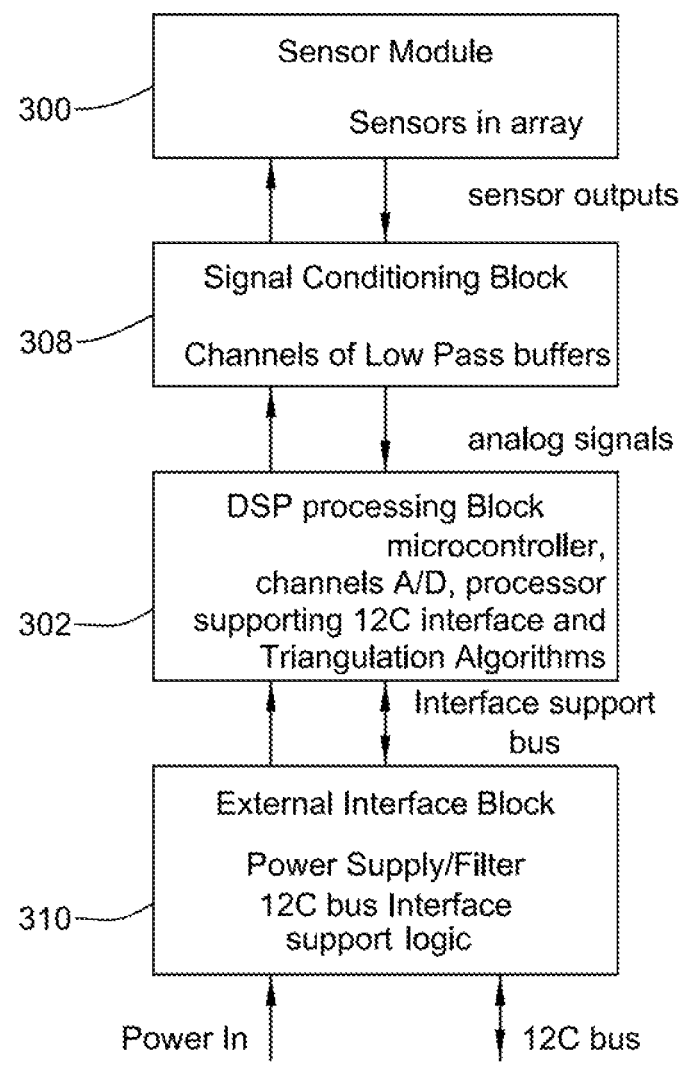
FIG. 20 is a block diagram of the sensor module, signal conditioning block, DSP block, and external interface block according to one embodiment.

Referring to FIG. 20, a block diagram of the sensor module, signal conditioning block, DSP block, and the external interface block is shown. As stated earlier, the sensor module 300 may be communicatively coupled to a signal conditioning block 308 which in turn may be communicatively coupled to DSP block 302. The DSP block 302 may then be coupled to an external interface block (EIB) 310. The EIB 310 may be coupled to the I2C bus of a remotely controlled device controller (not shown), hereafter referred to as the RCDC, for the remotely controlled device. In some embodiments, the components of the sensor module, DSP block, EIB block and signal conditioning block unit may be fixed inside an enclosure or casing. Alternatively, in some embodiments, the components of the sensor module, DSP block, EIB block and signal conditioning block may be modular and may be removable.

Figure 4:
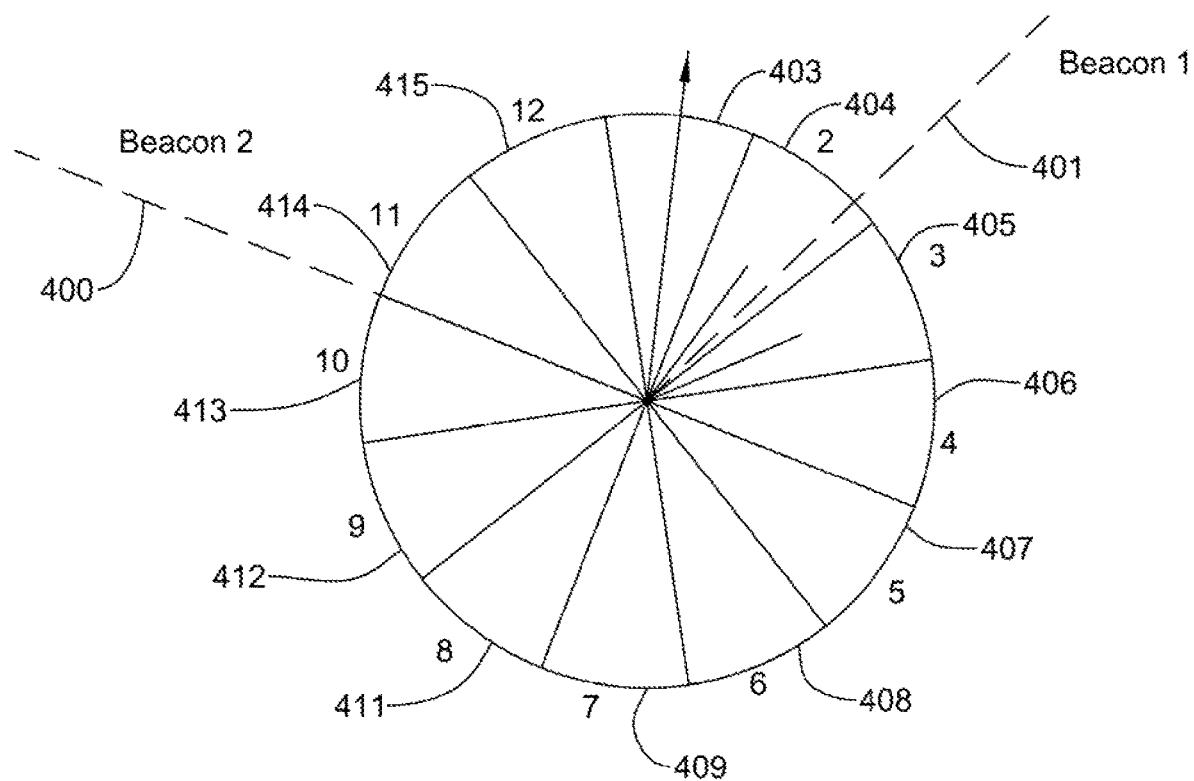
FIG. 4 is a diagram of a sensor module and emitter signals according to one embodiment.

Referring to FIG. 4, an overhead view of an exemplary sensor module is shown with one embodiment of the physical arrangement of detectors shown. Although a total of twelve (12) detectors are shown, the sensor module may include more or less detectors. The number of detectors may be driven by the type of detector and the device's effective Field of View (FOV). The detector numbers and physical configuration would be such as to provide full 360 degree coverage. Emitter signals 400/401 may be emitted by emitter units (not shown, shown as 104 in FIG. 1). Detectors 403, 404, 405 and 406 may detect the emitter signal from emitter 401. In some embodiments, detectors 407, 408, 409, and 411 may not detect an emitter signal. In some embodiments, detectors 412, 413, 414 and 415 may detect the emitter signal from emitters 400. Note that the intensity of the emitter signal detected by detector 403, 405, and 406 may be less than that of detector 404. Also note that the intensity of the emitter signal detected by detector 412 and 415 may be less than that of detector 413 and 414. In some embodiments, the user may program the microprocessor to ignore the input from the detectors, if the intensity is below a threshold designated by the user. The relative intensity of each emitter at detectors 403, 404, 405 and 406, and detectors 407, 408, 409, and 411 may be measured and recorded in a microcontroller (not shown, shown as 303 in FIG. 3). Based on the differences in intensity between the detectors, the microcontroller may be programmed to determine which detectors are aligned with the emitters (in this example, detectors 404 and between 413/414) and therefore may be able determine the orientation of remotely controlled device relative to the emitters. Based on the intensity of the emitter signal, the microprocessor may then determine the distance from the detectors to the emitter units. Since the emitter units' positions may be known, it may then be possible to compute the remotely controlled devices position relative to the emitter units.

Based on input from the sensor module, the information and data the microcontroller 303 may provide includes, but is not limited to, one or more of the following: the remote control device's position in X, Y coordinates, orientation relative to the field in polar coordinates, current average speed, acceleration and deceleration, and emitter signal strength levels per sensor unit for diagnostics, calibration, testing purposes.

Moreover, the microcontroller 303 may provide data logging between user designated intervals with fixed sample rates for information such as, but not limited to, one or more of the following: X, Y position coordinates within a field, the speed of the remotely controlled device, average speed of the remotely controlled device, direction of remotely controlled device, acceleration/deceleration data, distance traveled, and angular/linear kinematics data. In such embodiments, the microcontroller 303 may send data logging information to the RCDC.

In some embodiments, the microcontroller 303 may enable control options for the remotely controlled device which may include, but is not limited to, one or more of the following: programming a remotely controlled device to go to X,Y field position autonomously, programming a remotely controlled device to go to X,Y field position and orient itself in a particular direction autonomously, programming a remotely controlled device to follow a predetermined path as directed by a user or by additional signals on the field, autonomous navigation to fixed points on field with dynamic boundaries or obstacles, and programming a remotely controlled device to follow a circular path or arc path autonomously for defensive blocking of other remotely controlled devices. In such embodiments, the microcontroller 303 may operate with or assist the RCDC.

In some embodiments, the microcontroller 303 may further allow for a number of game options for robotics competitions including, but not limited to, one or more of the following: scoring based on the least distance covered during competition, scoring based on robot location during certain time periods (i.e. being located at X,Y position at the end of a match), speed and acceleration limiting per game rules, and autonomous or teleoperated scavenger hunts using the processor to report locations of found objects. In some embodiments, the microcontroller may also be programmed to avoid certain "penalty" areas located on the field. In such embodiment, the microcontroller 303 may operate with or assist the RCDC.

In addition, in some embodiments, the microcontroller 303 may also allow for auto-fixed target tracking while remotely controlled device is moving either autonomously or during teleoperation. The microcontroller 303 may allow for collision detection between multiple remotely controlled devices or remotely controlled devices and a field using user code intentions and the motion status of the remotely controlled device. By way of example, but not by way of limitation, in some embodiments, a user may program a remotely controlled device to reverse direction if the motion of the remotely control devices suddenly stops as a result of a collision and no "stop-drive" signal was given. In such embodiments, the microcontroller 303 may operate with or assist the RCDC.

The microcontroller 303 may allow for remotely controlled device coordination using processor telemetry data and inter-remotely controlled device communications, as well as sequencing of remotely controlled device actions on a field using remotely controlled device telemetry from each microcontroller and communication between remotely controlled devices. In such embodiments, the microcontroller 303 may operate with or assist the RCDC.

In addition, the microcontroller 303 may allow for a whole series of teleoperated assisted operations, such as "drive to X, Y" commands or auto-target pointing, which may allow for user initiated command sequences, and computer-assisted high speed turns. The teleoperated assisted operations also may allow for relay races with set meeting locations on a field, handoffs between remotely controlled devices using orientation of partnered remotely controlled devices, and tag team operation using remotely controlled device communications and information from the processor to plot intersect meeting points. In such embodiments, the microcontroller 303 may operate with or assist the RCDC.

Furthermore, in some embodiments, the microcontroller 303 may allow for data logging which may in turn allow remotely controlled device performance characterization and optimization using telemetry data. Also, data logging may allow for replays of matches using data log telemetry information to control a remotely controlled device. Processing of data logging, in some embodiments, may allow users to view in a virtual environment the robot movement in either real time or replay in both real time and slow motion. This may provide the opportunity to play virtual matches, test/analyze match play, test/analyze robot code performance, and debug robot operation (real time or post match play). In such embodiments, the microcontroller 303 may send data logging information to the RCDC.

In some embodiments, the microcontroller 303 may provide improved user/remotely controlled device interface due to higher level of control, information, and ease of implementation. For example, microcontroller telemetry data may be sent to a user interface for updated status and course correction and may provide a mechanism for detecting mechanical/electrical failure of the robot drive assembly and thus may help the user (or user code) to compensate for a weak or damaged drive train. In such embodiments, the microcontroller 303 may operate with or assist the RCDC.

The Camera Module and Processor

Figure 5:
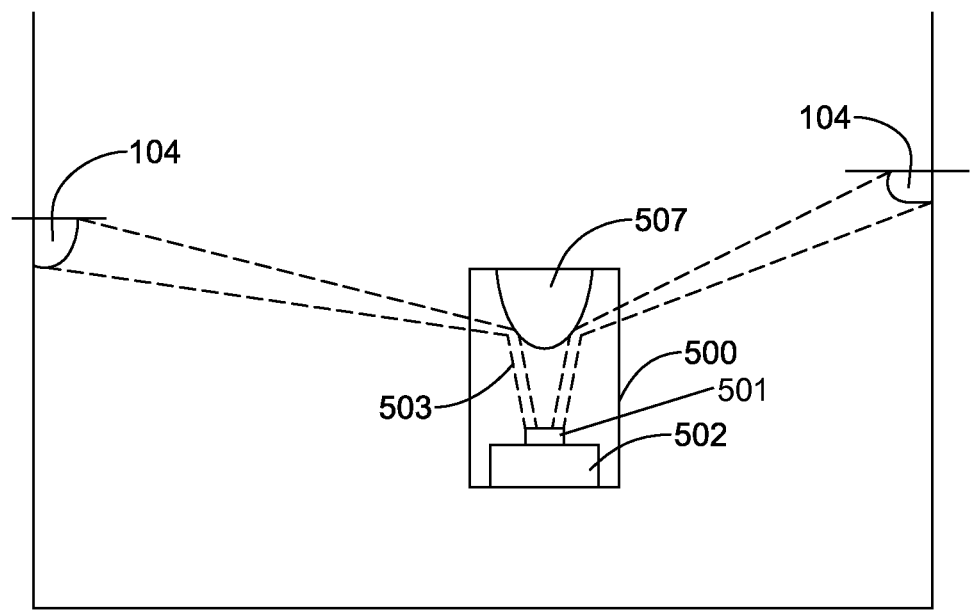
FIG. 5 is a diagram of a camera module according to one embodiment.
Figure 5A:
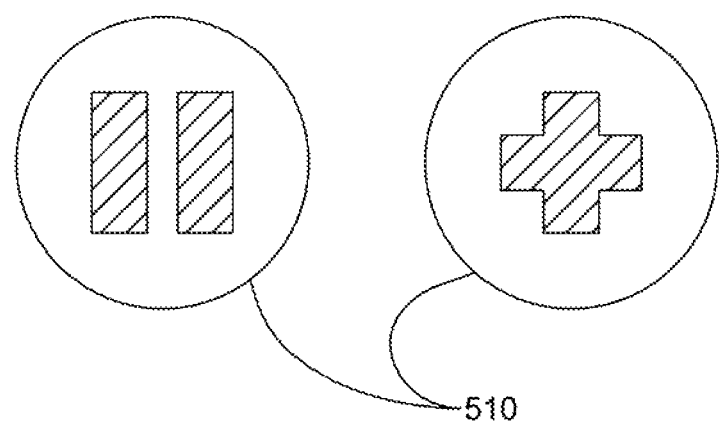
FIG. 5A are illustrations of embodiments of passive emitter targets/symbols which may be used in some embodiments.

Referring to FIG. 5, one embodiment of a sensor module, hereafter referred to as a camera module, is shown. In some embodiments, the camera module 500 may include at least one mirror 501 positioned above a camera 502. The mirror may be configured to have a 360 degree field of view around a remotely controlled device. In such embodiments, the mirror may reflect an image 503 of emitter units 104 positioned around the remotely controlled device. Furthermore, in some embodiments, the mirror may be conically shaped. In some embodiments, the mirror may reflect an image such as those shown in FIG. 5A, which represent two embodiments of images, however, in various embodiments the images may include, but are not limited to, any shape, color, symbol, alpha numeric representation, e.g., "DEKA01051982", and/or logo or other pictorial images, e.g., the U.S. FIRST logo. Vision processing may be performed by an external vision processor (not shown, shown on as 600 on FIG. 6) that may be provided to process the reflected emitter image received by the camera module. Alternatively, vision processing may be performed by an on onboard vision processor (not shown) that may be provided to process the reflected emitter image received by the camera module. Vision processing algorithms in conjunction with processing libraries such as, but not limited to, the cRIO or NI vision libraries, may be used to process the reflected image. Regardless of the type of processor, in various embodiments, the vision processor may calculate the orientation and position of the remotely controlled device on the field based on the position of the reflected emitter detected by the camera module. The vision processor may dynamically update and provide information to an RCDC (not shown, shown as 601 on FIG. 6 and FIG. 7) for the remotely controlled device. The RCDC (not shown, shown as 601 on FIG. 6 and FIG. 7) for the remotely controlled device may transmit the information to a user interface (not shown). In some embodiments, the components of the camera module may be fixed inside the camera module. Alternatively, in some embodiments, the components of the camera module may be modular and may be removable from the camera module. Referring now also to FIG. 5A, examples of embodiments of passive emitter targets/symbols 510 are shown. In various embodiments, the passive emitter targets/symbols may include, but are not limited to, any shape, size, color and/or text and/or number and/or pattern, and in some embodiments, may include various other symbols.

Figure 6:
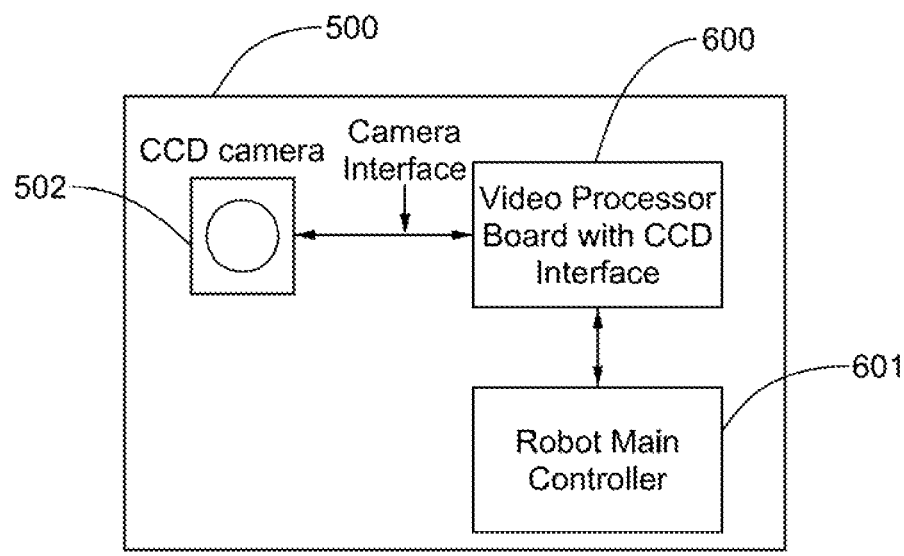
FIG. 6 is a diagram of a CCD camera module according to one embodiment.

Referring to FIG. 6, in some embodiments, the camera 502 in the camera module 500 may be an infrared charge-coupled device (CCD) camera. In such embodiments, the mirror 507 may be plated with gold to increase the infrared reflectivity of the mirror and decrease the distortion of the reflected emitter units. Moreover, in such embodiments, the charge-coupled device (CCD) camera may be communicatively coupled to a video processor 600 and programmed to detect the reflected image of the emitter units and track changed in the position of the emitter units in the reflected image of the emitter units. In some embodiments, vision processing algorithms in conjunction with processing libraries, such as, but not limited to, the cRIO or NI vision libraries, may be used to process the reflected image. The video processor 600 may calculate the orientation and position of the remotely controlled device on the field based on the position of the reflected emitter detected by the camera module. In some embodiments, the vision processor 600 may dynamically update and provide information about the position and orientation of the remotely controlled device to the RCDC 601 for the remotely controlled device. The RCDC 601 for the remotely controlled device may transmit the information to a user interface.

Figure 7:
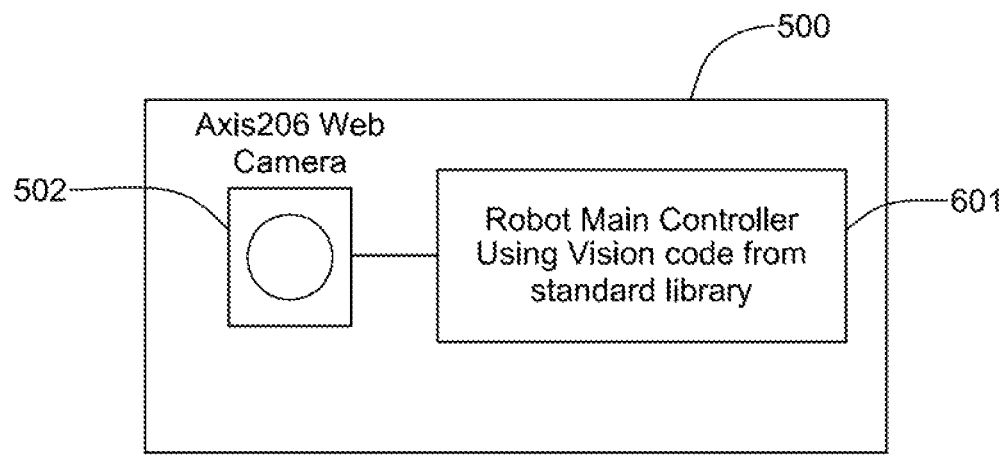
FIG. 7 is a diagram of a visible light camera module according to one embodiment.

Referring to FIG. 7, in some embodiments, the camera 502 in the camera module 500 may be a visible light camera. The visible light camera may be an Axis 206 web camera made by Axis Communications. In some embodiments, the visible light camera may be communicatively coupled to a main control module 601 for a remotely controlled device and programmed to detect the reflected image of the emitter units and track changed in the position of the emitter units in the reflected image of the emitter units. Vision processing algorithms in conjunction with processors such as, but not limited to, a cRIO made by National Instruments may be used to process the reflected image. Alternatively, vision processing algorithms in conjunction with a processor utilizing vision processing libraries such as, but not limited to, NI vision libraries may be used to process the reflected image. The RCDC 601 may calculate the orientation and position of the remotely controlled device on the field based on the position of the reflected emitter detected by the camera module. The RCDC 601 may dynamically update and store information about the position and orientation of the remotely controlled device. The RCDC 601 for the remotely controlled device may transmit the information to a user interface. In some embodiments, the RCDC may be a cRIO by National Instruments.

Based on input from the camera module, the information and data that the RCDC 601 may provide may include, but is not limited to, one or more of the following: the remote control device's position in X, Y coordinates, orientation relative to the field in polar coordinates, current average speed, acceleration and deceleration, and emitter signal strength levels per sensor unit for diagnostics, calibration, testing purposes.

Moreover, the RCDC 601 may provide data logging between user designated intervals with fixed sample rates for information such as, but not limited to, one or more of the following: X, Y position coordinates within a field, the speed of the remotely controlled device, average speed of the remotely controlled device, direction of remotely controlled device, acceleration/deceleration data, distance traveled, and angular/linear kinematics data.

The RCDC 601 may also enable control options for the remotely controlled device including, but not limited to, one or more of the following: programming a remotely controlled device to go to X,Y field position autonomously, programming a remotely controlled device to go to X,Y field position and orient itself in a particular direction autonomously, programming a remotely controlled device to follow a predetermined path as directed by a user or by additional signals on the field, autonomous navigation to fixed points on field with dynamic boundaries or obstacles, and programming a remotely controlled device to follow a circular path or arc path autonomously for defensive blocking of other remotely controlled devices.

The RCDC 601 may allow for a number of game options for robotics competitions including, but not limited to, one or more of the following: scoring based on the least distance covered during competition, scoring based on robot location during certain time periods (i.e. being located at X, Y position at the end of a match), speed and acceleration limiting per game rules, and autonomous or teleoperated scavenger hunts using the processor to report locations of found objects. In some embodiments, the RCDC 601 may be programmed to avoid certain "penalty" areas located on the field.

In some embodiments, the RCDC 601 may also allow for auto-fixed target tracking while remotely controlled device is moving either autonomously or during teleoperation. The RCDC 601 may allow for collision detection between multiple remotely controlled devices or remotely controlled devices and a field using user code intentions and the motion status of the remotely controlled device. By way of example, but not by way of limitation, a user may program a remotely controlled device to reverse direction if the motion of the remotely control devices suddenly stops as a result of a collision and no "stop-drive" signal was given.

The RCDC 601 may allow for remotely controlled device coordination using processor telemetry data and inter-remotely controlled device communications, as well as sequencing of remotely controlled device actions on a field using remotely controlled device telemetry from each microcontroller and communication between remotely controlled devices.

In addition, the RCDC 601 may allow for a whole series of teleoperated assisted operations, such as "drive to X, Y" commands or auto-target pointing, which may in turn allow for user initiated command sequences, and computer-assisted high speed turns. The teleoperated assisted operations also may allow for relay races with set meeting locations on a field, handoffs between remotely controlled devices using orientation of partnered remotely controlled devices, and tag team operation using remotely controlled device communications and information from the processor to plot intersect meeting points.

Furthermore, the RCDC 601 may allow for data logging which may in turn allow remotely controlled device performance characterization and optimization using telemetry data. Also, data logging may allow for replays of matches using data log telemetry information to control a remotely controlled device. Also, processing of data logging may allow users to view in a virtual environment the robot movement in either real time or replay in both real time and slow motion. This may provide the opportunity to play virtual matches, test/analyze match play, test/analyze robot code performance, and debug robot operation (real time or post match play).

The RCDC 601 may provide improved user/remotely controlled device interface due to higher level of control, information, and ease of implementation. For example, microcontroller telemetry data may be sent to a user interface for updated status and course correction, and may provide a mechanism for detecting mechanical/electrical failure of the robot drive assembly and thus may help the user (or user code) to compensate for a weak or damaged drive train.

The Field

Figure 8:
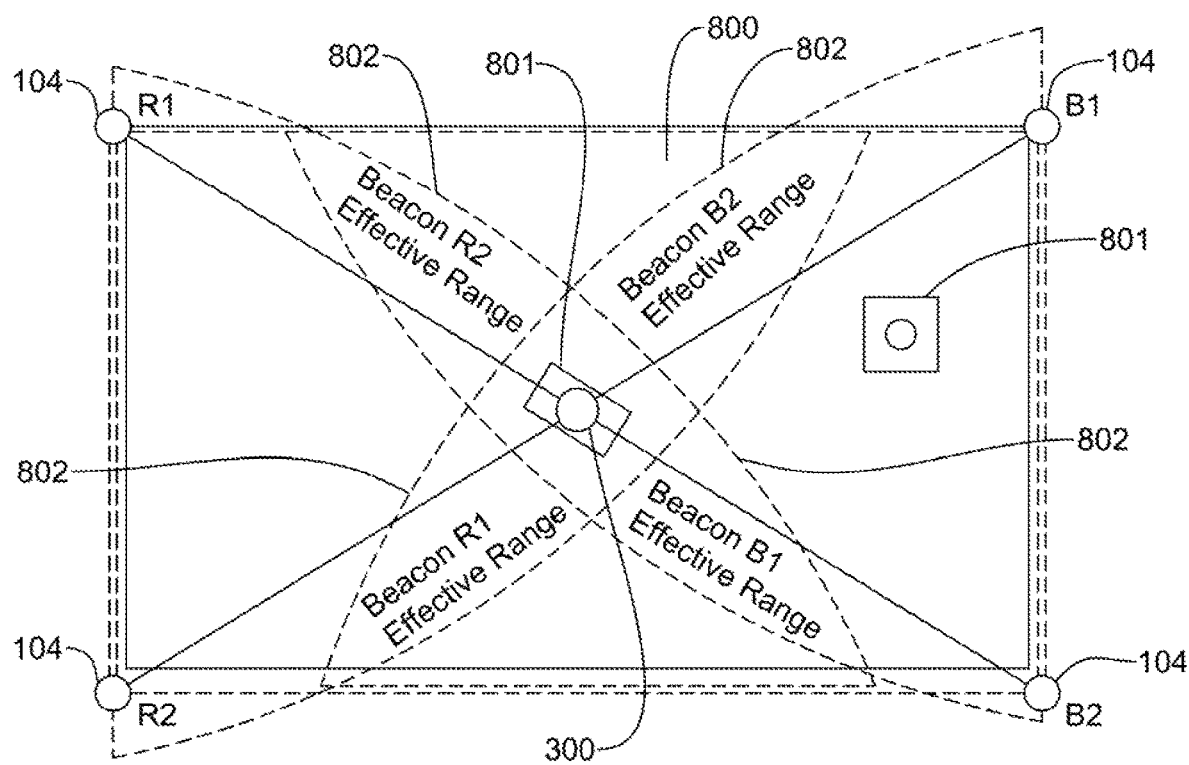
FIG. 8 is a diagram of a field with a control module, emitter units, and a sensor module on a remotely controlled device according to one embodiment.

Referring to FIG. 8, one embodiment of a field 800 with emitter units 104 placed in the corners of the field is shown. In such an embodiment, at least four (4) emitter units 104 may be placed in the corners of a field. One emitter unit may represent the 0-0 point on a Cartesian coordinate system, wherein all other coordinates from the origin are positive. Alternatively, the origin point may be defined by a user. For example, the center of the field, defined by four (4) emitters, may be designated as the 0,0 origin. A remotely controlled device 801 such as, but not limited to, a robot, may be placed within the field 800. A sensor module 300 may be coupled to the robot. It may be desirable, in some embodiments, for the sensor module 300 to be able to detect at least two (2) of the emitter signals at any given location with the field 800. In some embodiments, the emitter units 104 may be designed to have a 90×90 radial quadrant field of view.

The emitter signals may be detected by the sensor modules 300 on the remotely controlled device 801. The sensor module 300 may be connected to a DSP block (not shown, shown as 302 in FIG. 3). Alternatively, the sensors module may be communicatively coupled to a field management system (not shown, shown in FIG. 13), using, for example, but not limited to, a wireless connection. For additional information regarding the field management system, see attached Appendix A, U.S. Patent Publication No. 2009/0281676 which is U.S. patent application Ser. No. 12/425,149, filed Apr. 16, 2009 and entitled "System, Apparatus, and Method for The Management and Control of Remotely Controlled System", which is hereby incorporated herein by reference in its entirety. Regardless of whether the sensor module 300 may be coupled to a DSP block or a field management system, in some embodiments, the emitter signals may be processed in order to determine the intensity and angle of the emitters on the remotely controlled device. Based on the intensity and angle of the emitter units 104, the position and orientation of the detectors may be computed, which, in turn, may be used to compute the orientation and position of the remotely controlled device 801. Wireless transceivers (not shown, shown as 1200 in FIG. 13) may be coupled to the field management system and may transmit the position and orientation data of each remotely controlled device to a wireless transceiver (not shown, shown as 1201 in FIG. 13) coupled to each remotely controlled device which may then be processed by an RCDC. Alternatively, a DSP block may transmit the position and orientation data of the remotely controlled device to the RCDC.

As stated above, in some embodiments, the orientation and position of the remotely controlled device on the field may be calculated based on the intensity and angle of the of the emitter signals detected by the sensor units. The orientation may be based on the detection of at least two emitter signals being received by the individual detectors or combination of detectors (overlapping emitter signal detection) using known emitter unit positions. In some embodiments, the orientation may be reported in degree increments. Alternatively, the orientation may be reported in half degree increments. Position on the field may be calculated using the relative orientation and distance of the sensor unit to the emitter units, based on the relative intensity of the emitter signal being received by the sensor unit, using known emitter unit positions. In another embodiment, position may be reported in feet or inches for both the X and Y coordinates.

Figure 9:
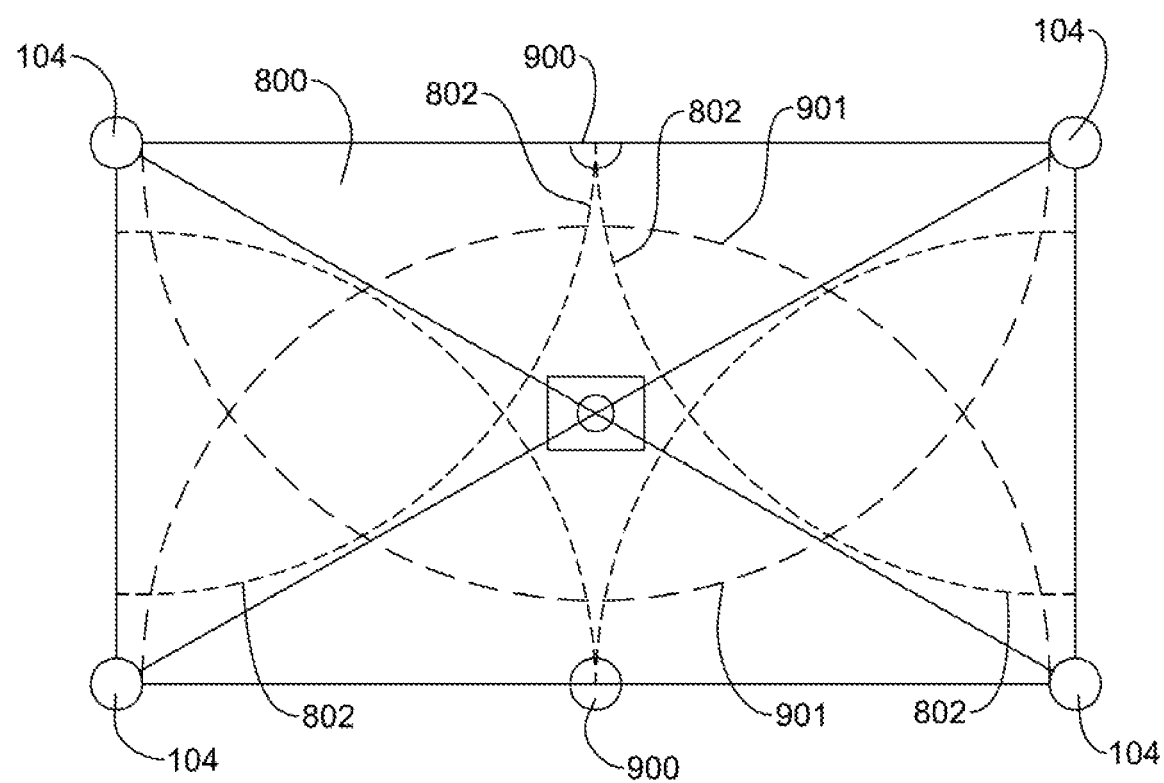
FIG. 9 is a diagram of a field with overlapping emitter signals according to one embodiment.

Referring to FIG. 9, where the emitter units 104 in the corners of the field 800 may not provide adequate emitter signal coverage area 802 over the entire field, then, in some embodiments, additional emitter units 900 may be positioned along the edges of the field. However, in some embodiments, the additional emitter units 900 may be positioned in areas obscured by obstacles on the field. This may be desirable to provide additional emitter signal coverage area 901 such that at least two (2) emitters are visible at any position on the field.

Figure 10:
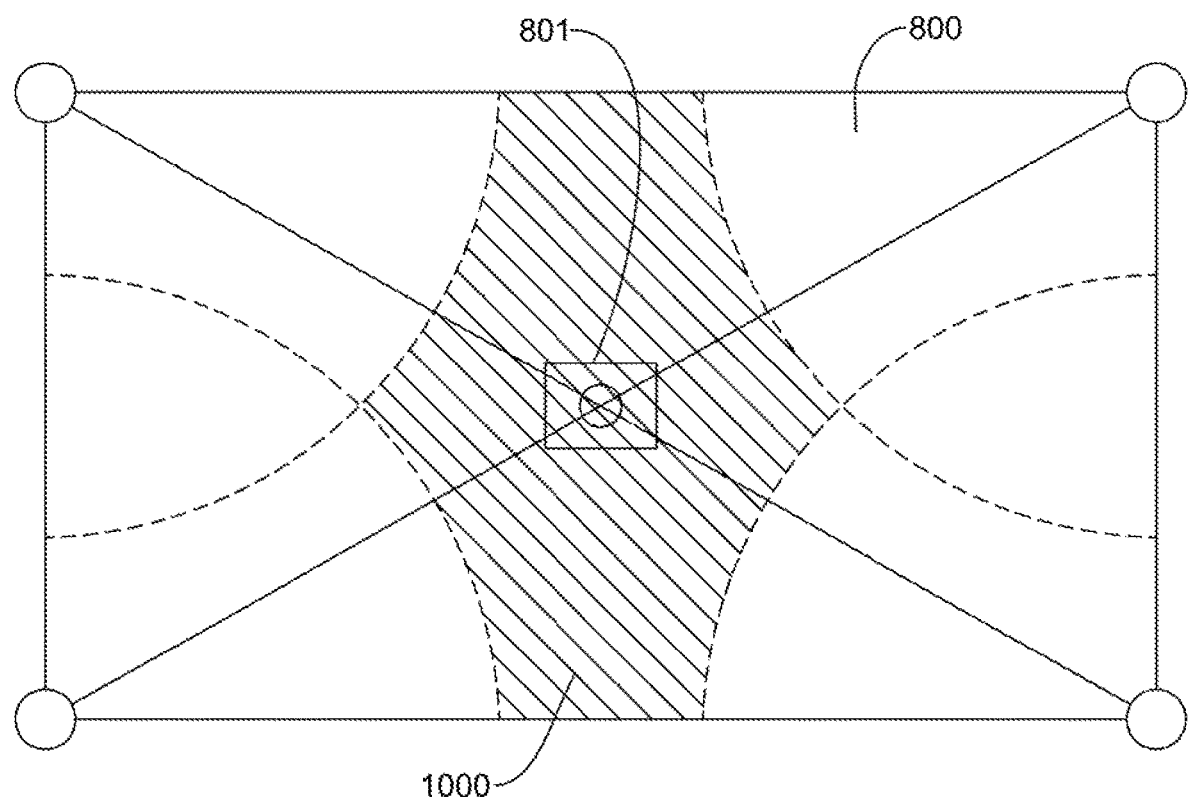
FIG. 10 is a diagram of a field with emitter signals and "dark" zones according to one embodiment.

Referring to FIG. 10, in some embodiments, areas of the field 800 may be designed to not have emitter signal coverage and therefore have "dark" zones 1000 with no signal. In such embodiments, pre-programmed commands may be included in the user code and may allow for the remotely controlled device 801 to navigate autonomously in these "dark" zones 1000. In another embodiment, the remotely controlled device 801 may be programmed to avoid the location of "dark" zones 1000 or other known obstacles on the field (not shown).

Figure 11:
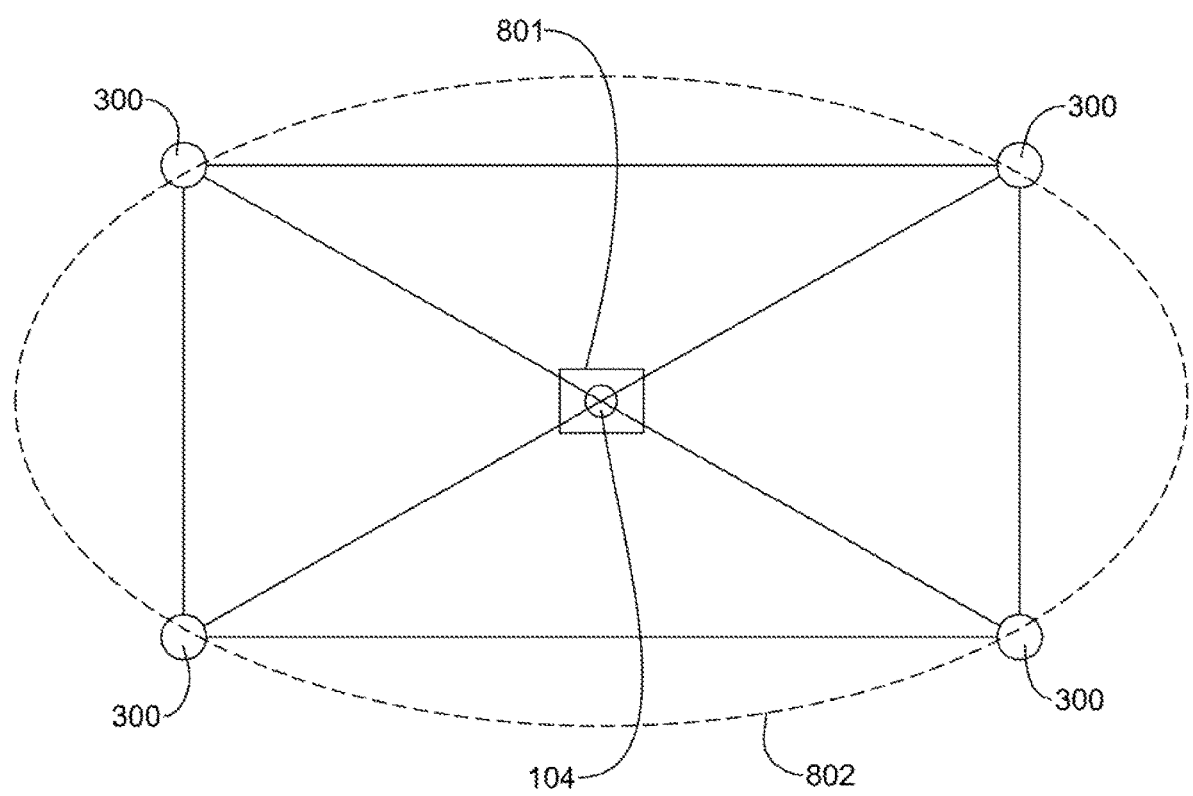
FIG. 11 a diagram of a field with a control module, a sensor modules, and emitter units on a remotely controlled device according to one embodiment.
Figure 12:
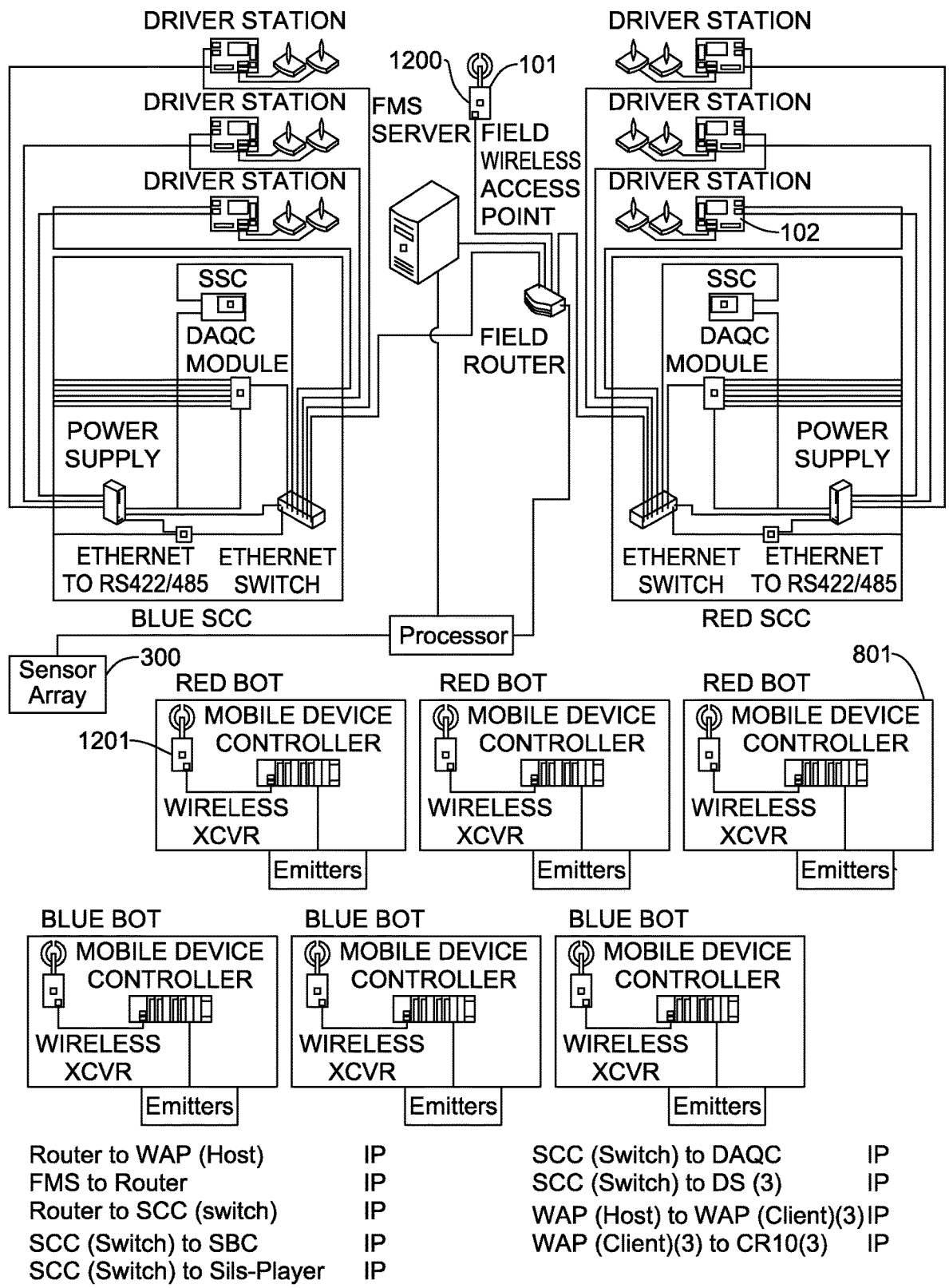
FIG. 12 is a diagram of a field management system according to one embodiment.

Referring to FIG. 11, in some embodiments, sensor modules 300 may be placed on the corners of the field 800 and emitter units 104 may be attached to remotely controlled devices 801. In such an embodiment, the emitter units 104 may be placed around the remotely controlled device 801 in order to produce emitter signal coverage areas 802 all around (360 degrees field of view) the field 800. The emitter signals may be detected by the sensor modules 300 in the corners of the field 800. The sensor module 300 may be connected to a DSP block (not shown, shown as 302 in FIG. 3). Alternatively, the sensors module may be connected to a field management system (as shown in FIG. 12). Regardless of whether the sensor module 300 may be coupled to a DSP block or a field management system, the emitter signals may be processed in order to determine the intensity and angle of the emitters on the remotely controlled device. Based on the intensity and angle of the emitter units 104, the position and orientation of the detectors may be computed. This, in turn, may be used to compute the position and orientation of the remotely controlled device 801. In some embodiments, a wireless transceiver (not shown, shown as 1200 in FIG. 12) coupled to the field management system or DSP block may transmit the position and orientation data of each remotely controlled device to a wireless transceiver (not shown, shown as 1201 in FIG. 12) coupled to each remotely controlled device.

A processor (not shown), in some embodiments, may calculate the orientation and position of the remotely controlled device on the field based on the intensity and angle of the of the emitter signals detected by the sensor units. The processor may be a microcontroller in a DSP block. Alternatively, the processor might be a microcontroller communicatively coupled to a field management system. The orientation may be based on the detection of at least two emitter signals being received by the individual detectors or combination of detectors (overlapping emitter signal detection) using known emitter unit positions. In one embodiment, the orientation may be reported in degree increments. Alternatively, the orientation may be reported in half degree increments or other increments. Position on the field may be calculated using the relative orientation and distance of the sensor unit to the emitter units. This may be based on the relative intensity of the emitter signal being received by the sensor unit using known emitter unit positions. In another embodiment, position may be reported in feet or inches for both the X and Y coordinates.

Referring back to FIG. 8, in some embodiments, where the sensor modules 300 may be located on the remotely controlled devices 801 and the emitter units 104 may be located in the corners of a field 800, a remotely controlled device 801 may wirelessly transmit position data to other remotely controlled devices 801 located on the field. In such embodiments, a wireless transceiver (not shown) may be coupled to the microprocessor on each remotely controlled device and the position data may be sent wirelessly between each remotely controlled device. This data may also be transmitted wirelessly to a user interface. Alternatively, the position data may be transmitted wirelessly from the remotely controlled device to a field management system (such as in FIGS. 12 and 13). The field management system may then retransmit the position data to a user interface or to other remotely controlled devices located on the field. The field management system may be able to process the position data in order to recognize and assess penalties for aggressive gameplay between remotely controlled devices. The field management system may further be configured to detect if a remotely controlled device has moved into a penalty zone and/or a "keepout zone", which may be any zone or area that may be off-limits or "out of bounds" on the field (for example, for a particular remotely controlled device or for one or more remotely controlled devices) and assess penalties accordingly. In some embodiments, the field management system may turn the emitter signals off for a specific interval, so that the remotely controlled devices may have to be autonomously controlled via user code programmed into the remotely controlled device or controlled by a user while the emitter signal is disabled. In some embodiments, the field management system may turn off the sensor module for a specific interval for all remotely controlled devices on the field or for a specific remotely controlled device on the field. In such embodiments where the field management system may disable a specific remotely controlled device, the remotely controlled device may be selected based on certain game conditions. These conditions may include, but are not limited to, one or more of the following: the number of points a remotely controlled device has earned during a match (i.e. if it has the most points during the last minute of a match), if the remotely controlled device has moved into a penalty zone, or if a goal was scored by the remotely controlled device scored. The field management system may be used to turn off an emitter signal, so as to create "dark" zones (discussed above) on the field.

Referring to FIG. 12, one embodiment of a field management system is shown. In some embodiments, sensor modules 300 may be placed on the corners of the field (not shown, shown as 800 in FIG. 8). Emitter units 104 may be attached to remotely controlled devices 801. In such embodiments, the emitter units 104 may be placed around the remotely controlled device 801 in order to produce emitter signals all around (360 degrees field of view) the field 800. The emitter signals may be detected by the sensor modules 300 in the corners of the field 800. The sensor module 300 may be connected to a DSP block (shown as 302 in FIG. 3). Alternatively, the sensors module may be connected to a field management system. Regardless of whether the sensor module 300 may be coupled to a DSP block or a field management system, the emitter signals may be process in order to determine the intensity and angle of the emitters on the remotely controlled device. Based on the intensity and angle of the emitter units 104, the position and orientation of the remotely controlled device 801 may be computed. Wireless transceiver 1200 coupled to the field management system or DSP block may transmit the position and orientation data of each remotely controlled device to a wireless transceiver 1201 coupled to each remotely controlled device.

A processor (not shown) may calculate the orientation and position of the remotely controlled device on the field based on the intensity and angle of the of the emitter signals detected by the sensor units. The processor may be a microcontroller in a DSP block. Alternatively, the processor might be a microcontroller communicatively coupled to a field management system. The orientation may be based on the detection of at least two emitter signals being received by the individual detectors or combination of detectors (overlapping emitter signal detection) using known emitter unit positions. In some embodiments, the orientation may be reported in degree increments. Alternatively, in some embodiments, the orientation may be reported in half degree increments or other degree increments. Position on the field may be calculated using the relative orientation and distance of the sensor unit to the emitter units, based on the relative intensity of the emitter signal being received by the sensor unit using known emitter unit positions. In some embodiments, position may be reported in feet or inches for both the X and Y coordinates.

Figure 13:
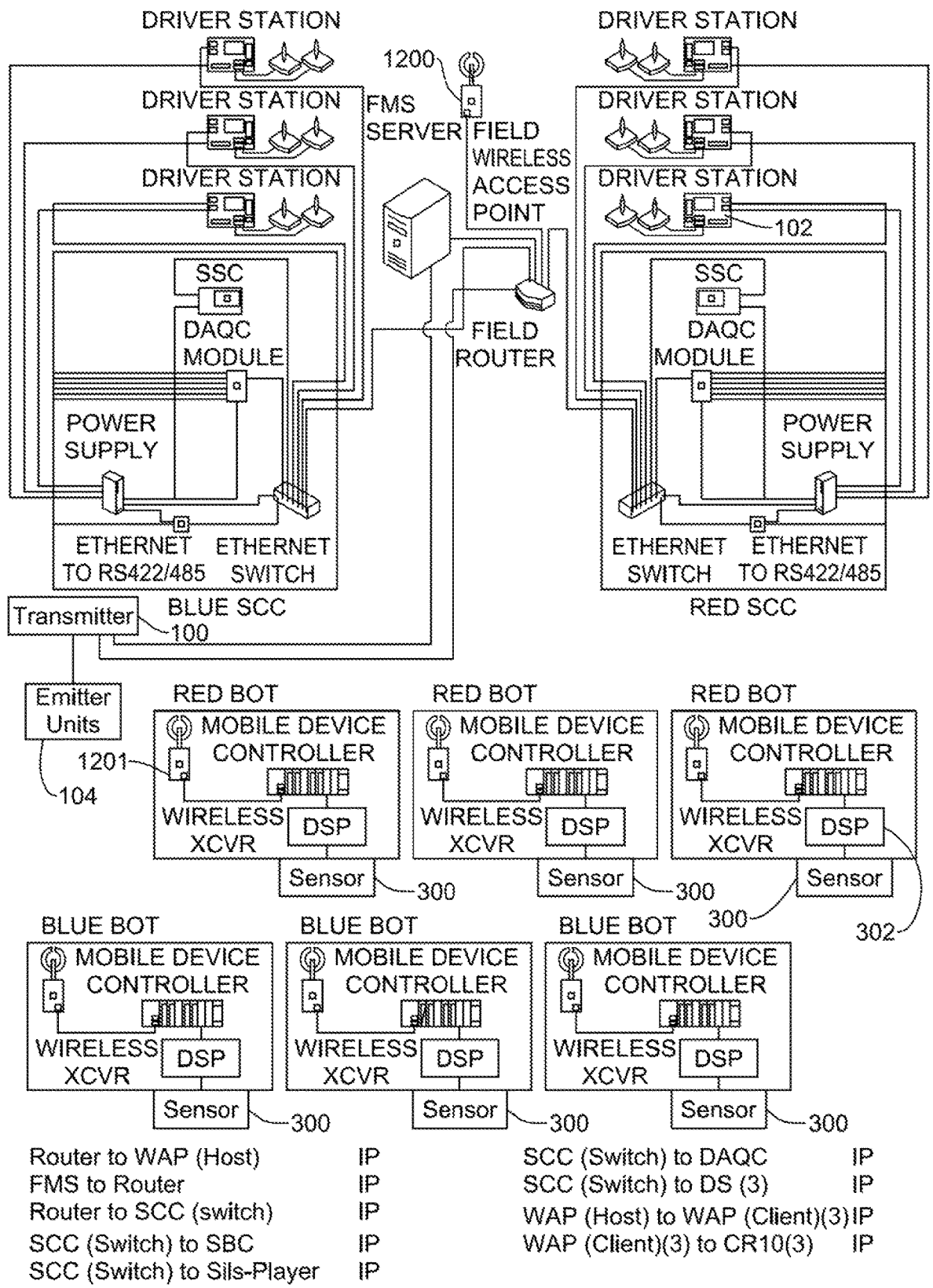
FIG. 13 is a diagram of a field management system according to one embodiment.

Referring to FIG. 13, one embodiment of a field management system is shown. In some embodiments, emitter units 104 may be placed on the corners of the field (not shown, shown as 800 in FIG. 8). The control module 100 may be coupled to the emitter unit 104 and may be coupled to the field management system. In some embodiments, the control module 100 may be couple field management system via an Ethernet connection or a USB connection. In some embodiments, the control module 100 may be couple field management system via a wireless connection. In such embodiments, the field management wireless transceiver 1200 or a separate wireless unit (not shown) may be used. Sensor modules 300 may be attached to remotely controlled devices 801. In such an embodiment, the sensor modules 300 may be placed around the remotely controlled device 801 in order to produce emitter signals all around (360 degrees field of view) the field 800. The emitter signals may be detected by the sensor modules 300 on the remotely controlled devices 801. In some embodiments, the sensor module 300 may be connected to a DSP block 302 and the emitter units 104 may be coupled to and driven by a control module 100. Alternatively, in some embodiments, the emitter units 104 may be coupled to and driven by the field management system. Regardless of whether the emitter units 104 may be coupled to a control module or a field management system, the emitter signals 802 may be processed by the remotely controlled device 801 in order to determine the intensity and angle of the emitters on the remotely controlled device. Based on the intensity and angle of the emitter units 104, the position and orientation of the remotely controlled device 801 may be computed. In some embodiments, a wireless transceiver 1200 coupled to the field management system or a separate wireless unit may receive the position and orientation data of each remotely controlled device from a wireless transceiver 1201 coupled to each remotely controlled device. The field management system or the separate wireless unit may transmit the position and orientation data to other remotely controlled devices on the field.

In some embodiments, a processor (not shown) may calculate the orientation and position of the remotely controlled device on the field based on the intensity and angle of the of the emitter signals detected by the sensor units. The processor, in some embodiments, may be a microcontroller in a DSP block however, in other embodiments, the processor might be a microcontroller communicatively coupled to a field management system. The orientation may be based on the detection of at least two emitter signals being received by the individual detectors or combination of detectors (overlapping emitter signal detection) using known emitter unit positions. In some embodiments, the orientation may be reported in degree increments, however, in other embodiments, the orientation may be reported in half degree increments. Position on the field may be calculated, in some embodiments, using the relative orientation and distance of the sensor unit to the emitter units, based on the relative intensity of the emitter signal being received by the sensor unit using known emitter unit positions. In another embodiment, position may be reported in feet or inches for both the X and Y coordinates.

Figure 14:
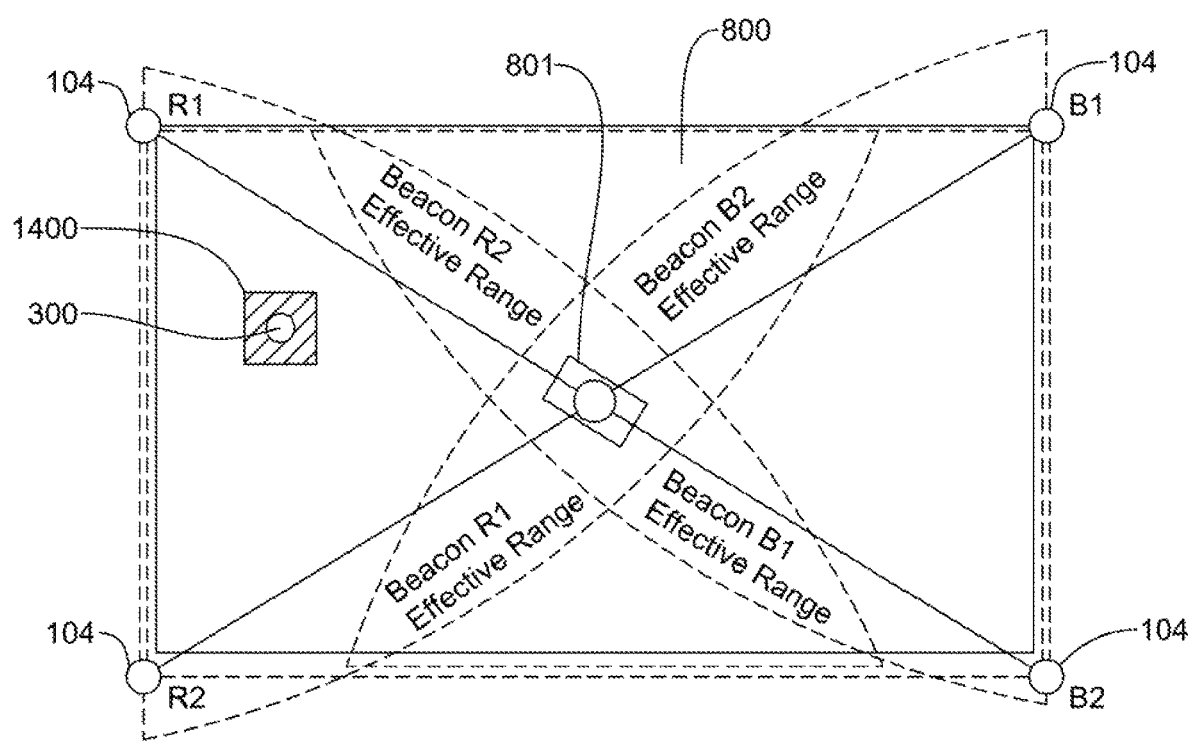
FIG. 14 is a diagram of a field with a control module, emitter units, a sensor module on a remotely controlled device, and a dynamic obstacle according to one embodiment.

Referring to FIG. 14, in addition to processing position data from remotely controlled devices, the field management system (not shown, shown in FIGS. 12 and 13) may, in some embodiments, process position data from dynamic field element 1400 on the field 800 that moves around the field 800. The dynamic field element 1400 may be a dynamic obstacle that a remotely controlled device may need to avoid, however, in some embodiments, the dynamic field element 1400 may be a dynamic goal that the remotely controlled device 801 may need to, but not limited to, one or more of the following: track, follow, capture, possess, and/or acquire.

In some embodiments, a sensor module 300 and a microprocessor (not shown) may be coupled to the dynamic field element 1400. Alternatively, a camera module (not shown) and a microprocessor (not shown) are coupled to the dynamic field element 1400. The microprocessor may compute and wirelessly transmit the position of the dynamic field element 1400, relative to the emitter units 104, to a field management system. The field management system may then retransmit the position and orientation of the dynamic field element to a user interface or directly to the remotely controlled devices. In some embodiments, the dynamic field element 1400 may transmit the position data directly to the remotely controlled devices on the field or to a user interface. Remotely controlled devices 801 on the field 800 may be programmed to perform certain actions which may include, but is not limited to, one or more of the following: tracking, following, capturing, possessing, acquiring or avoiding the dynamic field element 1400. However, in some embodiment, emitters (not shown) may be placed on the dynamic field element 1400. The remotely controlled device 801 may, in some embodiments, track the emitter signal with the sensors 300 and may perform certain actions which may include, but is not limited to, one or more of the following: tracking, following, capturing, possessing, acquiring or avoiding the dynamic field element 1400. In some embodiments, the field management system may control the orientation and position of the dynamic field element 1400, however, in some embodiments, the field management system may stop the transmission of the position and orientation data of the dynamic field element to the remotely controlled devices on the field for a specified interval.

As discussed above, position data may be transmitted to a user interface. In such embodiments, the user may also input commands to the remotely controlled device in a variety of ways. In some embodiments, the position of the remotely controlled device on the field may be displayed to the user on a touch screen. The user may then press a location on the field (as shown on the touch screen) and a command signal may be transmitted wirelessly to the remotely controlled device. Based on the user code, the remotely controlled device may then navigate to the point indicated on the touch screen. In another embodiment, the user may be provided with the X,Y coordinates of the remotely controlled device on a digital display, such as an LCD. The user may then provide voice commands which are converted to a command signal that may be transmitted wirelessly to the remotely controlled device. Based on the user code, the remotely controlled device may then navigate to the area specified by the voice command.

In some embodiments, the user may be provided with a visual display wirelessly coupled to a camera which may be coupled to the remotely controlled device. The visual display may then display the view from the prospective of the remotely controlled device via the camera and update the view of the field in real time. Alternatively, a virtual field may be generated using a computer algorithm and displayed on the visual display. The algorithm may position a virtual camera on the virtual field based on the position and orientation data produced by the DSP block on the remotely controlled device. The algorithm may, in some embodiments, display a virtual view from the prospective of the remotely controlled device in the virtual field and update the virtual view of the field in real time.

There are many advantages to the systems, methods and devices described herein including that the sensor/detector is located on the remotely controlled/mobile device. Thus, the mobile device includes an active and/or real-time awareness of its location, including on the field. Thus, this may provide many advantages, including, but not limited to, improved resolution due to physical placement and/or increased robustness through independent navigational operation. Other advantages include an enriched and/or expanded interactions on the field for the remotely controlled devices.

Using location information, for example, a remotely controlled device may self-navigate, i.e., be autonomous, traveling to set points and set orientations, avoiding keep out areas with penalties and traveling to areas to earn/score points.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for remotely controlling devices comprising:
   a remotely controlled device;
   at least one electric emitter unit configured to emit at least one signal;
   a first sensor connected to the remotely controlled device, the first sensor comprising a first processor, the first sensor configured to receive the at least one signal, the first processor configured to compute a device position and a device orientation of the remotely controlled device;
   a dynamic field element;
   a second sensor and a second processor coupled with the dynamic field element, the second processor configured to compute an element position of the dynamic field element, relative to the at least one emitter unit; and
   a field management system configured to detect if the remotely controlled device moves into a type of zone on a playing field and assess a penalty;
   wherein the field management system comprises a processor configured to:
      disable the remotely controlled device for a pre-selected interval of time based at least on a number of points the remotely controlled device has earned during a match.

2. The system of claim 1 wherein the at least one electric emitter unit is an active emitter.

3. The system of claim 1 wherein the at least one electric emitter unit further comprises an external power supply.

4. The system of claim 1 wherein the at least one electric emitter unit further comprises an emitter controller.

5. The system as in claim 1 wherein the first processor being configured to perform a capture of the dynamic field element.

6. The system as claim 3 further comprising:
   a thermal sensor communicatively coupled with the emitter controller, the thermal sensor receiving temperature data from the at least one electric emitter, the thermal sensor sending the temperature data to the emitter controller.

7. The system as in claim 6 wherein the emitter controller directs heat dissipation of the at least one electric emitter when the temperature data exceeds a pre-selected threshold.

8. The system as in claim 1 wherein the field management system comprises:
   a processor configured to:
      disable the at least one electric emitter for a pre-selected interval of time.

9. The system as in claim 1 wherein the field management system comprises:
   a processor configured to:
      disable the first sensor for a pre-selected interval of time.

10. The system as in claim 1 wherein the field management system comprises:
    a processor configured to:
       disable the second sensor for a pre-selected interval of time.

11. The system as in claim 1 wherein the field management system comprises:
    a processor configured to:
       disable the remotely controlled device for a pre-selected interval of time.

12. The system as in claim 1 wherein the field management system comprises:
    a processor configured to:
       disable the remotely controlled device for a pre-selected interval of time based at least on a number of points the remotely controlled device has earned during a match.

13. A system for remotely controlling devices comprising:
    a remotely controlled device;
    at least one electric emitter unit configured to emit at least one signal;
    a first sensor connected to the remotely controlled device, the first sensor comprising a first processor, the first sensor configured to receive the at least one signal, the first processor configured to compute a device position and a device orientation of the remotely controlled device;
    a dynamic field element;
    a second sensor and a second processor coupled with the dynamic field element, the second processor configured to compute an element position of the dynamic field element, relative to the at least one emitter unit; and
    a field management system configured to detect if the remotely controlled device moves into a type of zone on a playing field and assess a penalty;
    wherein the field management system comprises a processor configured to:
       disable the remotely controlled device for a pre-selected interval of time based at least on whether the remotely controlled device has moved into a pre-selected type of zone.

* * * * *

UNITED STATES PATENT AND TRADEMARK OFFICE
CERTIFICATE OF CORRECTION

PATENT NO. : 11,131,747 B2
APPLICATION NO. : 13/077239
DATED : September 28, 2021
INVENTOR(S) : Chris P. Jennings et al.

Page 1 of 1

It is certified that error appears in the above-identified patent and that said Letters Patent is hereby corrected as shown below:

In the Claims

In Column 21, Line 50, in Claim 6, delete "claim 3" and insert -- claim 4 -- therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*